(12) United States Patent
Campbell

(10) Patent No.: US 11,416,542 B1
(45) Date of Patent: Aug. 16, 2022

(54) SYSTEM AND METHOD FOR UPLOADING STILL IMAGES OF MATCHING PLATES IN RESPONSE TO AN ALERT HIT LIST USING DISTRIBUTED LPR ACQUISITION

(71) Applicant: WAYLENS, INC., Cambridge, MA (US)

(72) Inventor: Jeffery R. Campbell, Warkworth (CA)

(73) Assignee: WAYLENS, INC., Cambridge, MA (US)

( * ) Notice: Subject to any disclaimer, the term of this patent is extended or adjusted under 35 U.S.C. 154(b) by 120 days.

(21) Appl. No.: 16/157,777

(22) Filed: Oct. 11, 2018

Related U.S. Application Data

(63) Continuation-in-part of application No. 16/156,254, filed on Oct. 10, 2018, now Pat. No. 11,250,054, and a continuation-in-part of application No. 16/106,777, filed on Aug. 21, 2018, now abandoned, and a continuation-in-part of application No. 15/618,286, filed on Jun. 9, 2017, now Pat. No. 11,151,192, and a continuation-in-part of application No. 15/591,459, filed on May 10, 2017, now abandoned.

(60) Provisional application No. 62/571,891, filed on Oct. 13, 2017, provisional application No. 62/571,884, filed on Oct. 13, 2017, provisional application No. 62/548,548, filed on Aug. 22, 2017.

(51) Int. Cl.
| | | |
|---|---|---|
| *G06F 16/583* | (2019.01) | |
| *G06F 16/735* | (2019.01) | |
| *G06F 16/78* | (2019.01) | |
| *G06F 16/783* | (2019.01) | |
| *G06F 16/23* | (2019.01) | |
| *G06V 20/40* | (2022.01) | |

(52) U.S. Cl.
CPC ...... *G06F 16/5846* (2019.01); *G06F 16/2365* (2019.01); *G06F 16/735* (2019.01); *G06F 16/784* (2019.01); *G06F 16/7867* (2019.01); *G06V 20/48* (2022.01)

(58) Field of Classification Search
None
See application file for complete search history.

(56) References Cited

U.S. PATENT DOCUMENTS

| | | | | |
|---|---|---|---|---|
| 2010/0142931 | A1* | 6/2010 | Tran | H04N 19/61 386/233 |
| 2016/0294569 | A1* | 10/2016 | Chen | H04L 41/5009 |
| 2017/0032402 | A1* | 2/2017 | Patsiokas | G06Q 30/0261 |

(Continued)

*Primary Examiner* — Giuseppi Giuliani
(74) *Attorney, Agent, or Firm* — Christopher P. Maiorana, PC

(57) ABSTRACT

A system comprising a capture device and a database. The capture device may be configured to (i) capture video and (ii) perform video analysis to extract metadata corresponding to the captured video. The database may be configured to (i) store the metadata, (ii) store an alert list comprising a search criteria, (iii) compare the metadata with the search criteria, (iv) communicate the alert list to the capture device if a match is detected between the metadata and the search criteria and (v) communicate an image to a subscriber associated with the alert list. The metadata may be used to determine objects detected in the video. The capture device may perform a cross-reference of the metadata with the search criteria after the alert list is received. The capture device may generate the image in response to a match of the metadata with the search criteria.

20 Claims, 11 Drawing Sheets

(56) References Cited

U.S. PATENT DOCUMENTS

2017/0323540 A1* 11/2017 Boykin .................... H04N 1/00
2017/0352250 A1* 12/2017 de Barros Chapiewski ................
                                                        H04W 4/021

* cited by examiner

SYSTEM AND METHOD FOR UPLOADING STILL IMAGES OF MATCHING PLATES IN RESPONSE TO AN ALERT HIT LIST USING DISTRIBUTED LPR ACQUISITION

This application relates to U.S. Provisional Application No. 62/571,891, filed Oct. 13, 2017. This application also relates to U.S. Ser. No. 16/156,254, filed Oct. 10, 2018, which relates to U.S. Provisional Application No. 62/571,884, filed Oct. 13, 2017. This application also relates to U.S. Ser. No. 16/106,777, filed Aug. 21, 2018, which relates to U.S. Provisional Application No. 62/548,548, filed Aug. 22, 2017. This application also relates to U.S. Ser. No. 15/618,286, filed Jun. 9, 2017. This application also relates to U.S. Ser. No. 15/591,459, filed May 10, 2017. Each of the mentioned applications are hereby incorporated by reference in their entirety.

FIELD OF THE INVENTION

The invention relates to video capture generally and, more particularly, to implementing a system and method for uploading still images of matching plates in response to an alert hit list using distributed LPR acquisition.

BACKGROUND

Public agencies and/or private entities are starting to use license plate (LP) databases. License plate databases have privacy implications. Some agencies/entities use the services of a commercial vendor of license plate recognition (LPR) data that needs to meet a high degree of accuracy in the dataset. Errors due to poor optical character recognition (OCR) of the photographed license plate numbers can result in mismatches between the license plate number queried and the results returned by the system. Data errors from a mismatch not only present risks to individual privacy, but also can waste resources and delay the resolution of investigations and/or the apprehension of subjects.

To reduce the risk that errors will escape detection, vendor systems need to display, along with the results, the actual picture of the license plate for visual verification of an accurate match. Over time any significant issues with the OCR capabilities and unacceptably high error rates can be addressed. Some entities and/or agency may require a certain accuracy rate of OCR.

Traditional systems for manual/visual verification employ a human to cross reference the OCR results from a photo with a visual inspection of the same photo. If the OCR results match the text that is deciphered visually, the stakeholder may take action. The traditional system is cumbersome in that the stakeholder performing the cross reference would need to request the video/photo or data portion, wait for the data to upload to the central database, download the data from the central database and then perform the review. The traditional systems are inefficient and do not provide real-time results.

It would be desirable to implement a system and method for uploading still images of matching plates in response to an alert hit list using distributed LPR acquisition.

SUMMARY

The invention concerns a system comprising a capture device and a database. The capture device may be configured to (i) capture video, (ii) perform video analysis to extract metadata corresponding to the captured video and (iii) communicate with a wireless communication device. The database may be configured to (i) communicate with the wireless communication device, (ii) store the metadata received from the wireless communication device, (iii) store an alert list comprising a search criteria, (iv) compare the metadata with the search criteria, (v) communicate the alert list to the capture device if a match is detected between the metadata and the search criteria and (vi) communicate an image to a subscriber associated with the alert list. The metadata may be used to determine objects detected in the video. The subscriber may provide the alert list to the database. The capture device may initiate a mode of operation to perform a cross-reference of the metadata with the search criteria after the alert list is received. The capture device may generate the image in response to a match of the metadata with the search criteria.

BRIEF DESCRIPTION OF THE FIGURES

Embodiments of the invention will be apparent from the following detailed description and the appended claims and drawings in which:

DETAILED DESCRIPTION OF THE EMBODIMENTS

Figure 1:
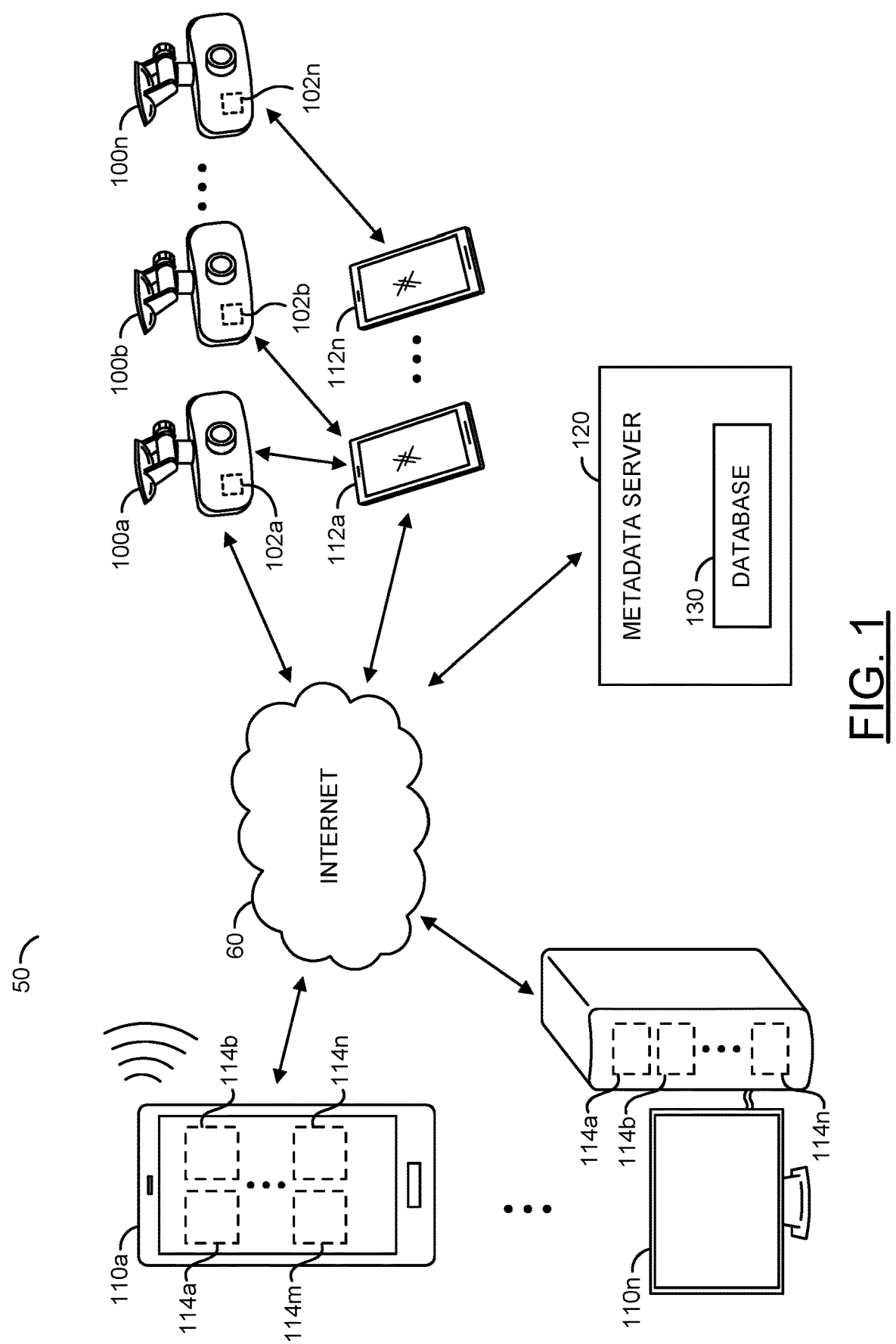
FIG. 1 is a diagram illustrating an example system in accordance with an embodiment of the present invention.

Embodiments of the present invention include uploading still images of matching plates in response to an alert hit list using distributed LPR acquisition that may (i) implement vehicle-mounted cameras configured to perform local video analytics, (ii) generate metadata corresponding to captured video, (iii) store metadata about multiple vehicles and objects, (iv) provide a searchable database of video metadata, (v) provide still images for manual inspection, (vi) use video analysis to determine a distance to objects, (vii) provide a notification of an alert hit list match to other devices in the vicinity, (viii) remotely provide alert hit lists to many users, (ix) enable event recreation using metadata from a video, (x) transfer data from a vehicle-mounted camera to a database via a user communication device, (xi) be implemented on a cloud-based database and/or (xii) use data effectively.

Embodiments of the present invention may be configured to provide 'real time' video analysis results along with still images for manual verification. When using the invention while driving, the video analysis may statistically identify the same license plate and/or object a number of times over a short period of time (e.g., the same vehicle or license plate may be detected over multiple video frames when following another car). For example, when driving behind another vehicle, the license plate may become large enough and clear enough for highly accurate detection (e.g., when the driver approaches the car from behind). In another example, the license plate may come in and out of view multiple times (e.g., if the car is in an adjoining lane that may be blocked by other vehicles from time to time).

Notifications of some detected license plates and/or objects can be sent to a subscriber. For example, the subscriber can provide an alert list (e.g., a hot list) and the video analysis may cross-reference with items on the alert list. When the cross-reference results in a hit (e.g., a match) a notification may be sent to the subscriber. Embodiments of the invention may be configured to detect the match to the alert list on a server. Prior to (or concurrent with) the hit, embodiments of the invention may send the license plate characters back to the driver who captured the data initially, as well as to all drivers in the vicinity. The object detection and/or video analysis modules on the camera devices for drivers in the vicinity of the detection may change a mode of operation.

In one example, the capture devices may capture plate tags and other metadata and send the data to a central server (or the cloud-based service). In another example, one of the modes of operation of the capture device may enable cross referencing new tags with the hit from the database and, if there is a match, take a still picture of the frame buffer. The still picture may be immediately sent with the metadata at the next upload interval. Embodiments of the invention may provide the still image of the hit to be visually (e.g., manually) cross referenced and verified.

Referring to FIG. 1, a diagram illustrating an example system 50 in accordance with an embodiment of the present invention is shown. The system 50 may comprise a block (or circuit) 60, blocks (or circuits) 100a-100n, blocks (or circuits) 110a-110n, blocks (or circuits) 112a-112n and/or a block (or circuit) 120. The block 60 may be a network. The blocks 100a-100n may implement video capture devices. The blocks 110a-110n may implement subscriber devices (e.g., subscriber communication devices). The blocks 112a-112n may implement user devices (e.g., user communication devices). The block 120 may implement a server computer. The system 50 may comprise other components (not shown). The number and/or types of components implemented by the system 50 may be varied according to the design criteria of a particular implementation.

The network 60 may enable communication between the various components of the system 50. In an example, the network 60 may be the internet and/or a wide area network. Some of the components of the system 50 may communicate with the internet 60 wirelessly. Some of the components of the system 50 may communicate with the internet via a hard-wired connection.

The subscriber devices 110a-110n and/or the user communication devices 112a-112n may be configured to execute computer readable instructions (e.g., executable programs, apps, binaries, etc.). For example, the subscriber devices 110a-110n and/or the user communication devices 112a-112n may be implemented as a desktop computer, a laptop computer, a netbook computer, a tablet computing device, a phablet computing device, a smartphone, a smartwatch, smart clothing (e.g., clothing with LTE communication built in), human implantable devices (e.g., a computer chip embedded under the skin), etc. In an example, the subscriber devices 110a-110n and/or the user communication devices 112a-112n may be implemented as a vehicle capable of 3G/4G/LTE/5G communication (e.g., a vehicle with a touchscreen infotainment system). Generally, the subscriber devices 110a-110n and/or the user communication devices 112a-112n may be a device capable of data transmission to the network 60 and may comprise a display, a processor, a memory, an input (e.g., mouse, keyboard, touchscreen, voice recognition, etc.) and/or an output (e.g., a display, haptic feedback, a speaker, etc.). In some embodiments, the subscriber devices 110a-110n and/or the user communication devices 112a-112n may have similar implementations. For example, the user communication devices 112a-112n may be wireless communication devices. The type and/or features of the subscriber devices 110a-110n and/or the user communication devices 112a-112n may be varied according to the design criteria of a particular implementation.

Each of the subscriber devices 110a-110n may be configured to connect to the network 60 (e.g., hard-wired, Wi-Fi, etc.). The subscriber devices 110a-110n may be configured to store and/or execute the computer readable instructions 114a-114n. Executing the computer readable instructions 114a-114n may enable the subscriber devices 110a-110n to display various interfaces, generate output and/or receive input. For example, the app 114a may be a front-end for interacting with the system 50.

Each of the capture devices 100a-100n may be configured to capture video data. In some embodiments, the capture devices 100a-100n may be implemented as vehicle-mounted cameras (e.g., dashcams) to record video while a user drives the vehicle. In one example, each vehicle may be equipped with one of the capture devices 100a-100n. In another example, one vehicle may be equipped with more than one of the capture devices 100a-100n (e.g., to capture multiple fields of view and/or perspectives from the vehicle). In some embodiments, the capture devices 100a-100n may be cameras mounted at stationary locations (e.g., security cameras mounted on buildings). For example, the stationary camera may generate metadata used to determine roadway data. The implementation of the capture devices 100a-100n may be varied according to the design criteria of a particular implementation.

In some embodiments, the capture devices 100a-100n may be configured to communicate directly with the network 60. For example, the capture devices 100a-100n may comprise components implementing Wi-Fi communication and/or 3G/4G/LTE/5G (e.g., cellular) communication. In some embodiments, the capture devices 100a-100n may be configured to communicate indirectly with the network 60. For example, the capture devices 100a-100n may comprise short-range communication such as Bluetooth and/or Wi-Fi (e.g., short-range communication to a tethered device such as a smartphone). A cost of manufacturing the capture devices 100a-100n may be reduced if no 3G/4G/LTE/5G is implemented. A 3G/4G/LTE/5G connection further adds costs for the user since 3G/4G/LTE/5G generally involves a subscription to a carrier (and potential data usage penalties). For example, a cost of the capture devices 100a-100n may be lower when Bluetooth alone and/or Bluetooth/Wi-Fi is implemented compared to a camera that implements 3G/4G/

LTE/5G hardware. Implementing the capture devices 100a-100n with a low cost may enable users to buy more than one of the capture devices 100a-100n and/or provide a larger user base. When the system 50 has more of the capture devices 100a-100n available to capture video data and/or provide metadata, more data points may be available for analysis. Generally, having more data points enables more useful analytical results generated by the system 50. In some embodiments, the capture devices 100a-100n may comprise a display and/or an input interface. For example, the capture devices 100a-100n may be configured to run apps (e.g., the computer executable instructions 114a-114n). In another example, the capture devices 100a-100n may be implemented as smartphones configured as cameras.

Each of the user communication devices 112a-112n may be configured to connect to the network 60 and/or the capture devices 100a-100n. In one example, the user communication devices 112a-112n may implement wireless communication devices. The user communication devices 112a-112n may comprise components configured to implement a wide area network connection (e.g., Wi-Fi) and/or local, device-to-device connections (e.g., Bluetooth, Zig-Bee, Z-Wave, etc.). For example, the user communication devices 112a-112n may implement a Wi-Fi and/or 3G/4G/LTE/5G connection to the internet 60 and a Bluetooth and/or Wi-Fi connection to one or more of the capture devices 100a-100n. In some embodiments, the user communication devices 112a-112n may be configured to send/receive data to/from the internet 60. For example, the user communication devices 112a-112n may receive data (e.g., video data, metadata, etc.) from one or more of the capture devices 100a-100n and transmit the data to the internet 60. In another example, the user communication devices 112a-112n may receive data (e.g., data requests, interrupt requests, firmware updates, etc.) from the internet 60 and transmit the data to the capture devices 100a-100n.

Generally, the user communication devices 112a-112n are implemented as portable devices (e.g., carried by a person, mounted in a vehicle, battery powered, etc.). The user communication devices 112a-112n may be configured to execute the computer readable instructions 114a-114n. In one example, the subscriber devices 110a-110n may store and/or execute one version (e.g., a subscriber version) of an app (e.g., the computer readable instructions 114a) and the user communication devices 112a-112n may store and/or execute another version (e.g., a provider version) of an app (e.g., the computer readable instructions 114b). One of the user communication devices 112a-112n may be configured to communicate with more than one of the capture devices 100a-100n (e.g., one smartphone may connect to multiple vehicle-mounted cameras in the same vehicle). In the example shown, the smartphone 112a communicates with the capture device 100a and the capture device 100b (e.g., the driver may have the smartphone and the vehicle may have two vehicle-mounted cameras). The connections between the user communication devices 112a-112n and/or the capture devices 100a-100n may be varied according to the design criteria of a particular implementation.

Each of the capture devices 100a-100n may comprise a respective block (or circuit) 102a-102n. The circuits 102a-102n may implement video processor functionality. In some embodiments, the circuits 102a-102n may be a system-on-chip (SoC). For example, the circuits 102a-102n may comprise input/output, a memory, processors, etc. The components and/or functionality of the circuits 102a-102n may be varied according to the design criteria of a particular implementation.

The circuits 102a-102n may be configured to record, encode, decode, transmit and/or store video data. The circuits 102a-102n may be configured to perform video analysis and/or video analytics. For example, the circuits 102a-102n may process video, identify patterns in the video data and/or recognize objects captured by the video data. Heuristics, templates and/or comparisons may be performed by the circuits 102a-102n to recognize and/or identify objects in captured video frames (e.g., video data) as objects that can be perceived by humans. In one example, the circuits 102a-102n may identify an object as a vehicle (or part of a vehicle such as a hood, a license plate, etc.). In another example, the circuits 102a-102n may identify text, shapes and/or colors. In yet another example, the circuits 102a-102n may identify objects (e.g., signs, pedestrians, street lights, etc.). The video data captured by the circuits 102a-102n may be stored by the capture devices 100a-100n. In one example, the circuits 102a-102n may implement a memory. In another example, the circuits 102a-102n may connect to an external memory (e.g., the capture devices 100a-100n may be configured to receive a flash memory such as a SD card, a microSD card, NAND memory, Compact Flash (CF) and/or an XD card).

The circuits 102a-102n may be configured to extract metadata from the captured video frames. The metadata may comprise information about objects detected in the video frames by the video analysis. The metadata may comprise information about the video data (e.g., a time the video was recorded, the model number of the camera recording the video, a location that the video was captured based on GPS information, an altitude that the video was recorded, a direction of the capture device while capturing the video data, etc.). For example, the circuits 102a-102n may comprise a GPS unit to determine GPS coordinates, a magnetometer to determine direction of travel and/or a real time clock (RTC) circuit to determine time.

The circuits 102a-102n may be configured to detect license plates. License plates may be detected, and the alphanumeric characters and/or symbols on the license plate may be identified. The license plate alphanumeric characters and/or symbols may be extracted from the captured video data as the metadata. For example, the circuits 102a-102n may detect, and store as metadata, the license plate alphanumeric characters and/or symbols, and store the license plate alphanumeric characters and/or symbols, the time the video was recorded, the longitude coordinate, the latitude coordinate, an altitude value, time of capture and/or the direction of the capture devices 102a-102n when the video was recorded. The circuits 102a-102n may be further configured to analyze the video data to extract metadata such as a make of a vehicle, a model of a vehicle, color(s) of a vehicle, number of pedestrians, number of vehicles and/or roadway characteristics (e.g., road condition, weather condition, traffic signals present, state of traffic signals, road signs present, amount of traffic, flow of traffic, etc.). The metadata may be associated with the corresponding video data. For example, each video clip captured may be assigned an identification number and the metadata associated with the video clip may have the identification number.

The server 120 may be configured to store data, retrieve and transmit stored data, process data and/or communicate with other devices. In an example, the server 120 may implement a metadata server. The server 120 may be implemented as part of a cloud computing platform (e.g., distributed computing). In an example, the server 120 may be implemented as a group of cloud-based, scalable server computers. By implementing a number of scalable servers, additional resources (e.g., power, processing capability, memory, etc.) may be available to process and/or store variable amounts of data. For example, the server 120 may be configured to scale (e.g., provision resources) based on demand. The server 120 may implement scalable computing (e.g., cloud computing). The scalable computing may be available as a service to allow access to processing and/or storage resources without having to build infrastructure (e.g., the provider of the system 50 may not have to build the infrastructure of the server 120).

The server 120 may be configured to execute computer readable instructions. In an example, the server 120 may process HTML, CSS, JavaScript, PHP, SQL, AJAX applications, APIs, etc. The server 120 may be configured to distribute apps (e.g., one or more of the computer readable instructions 114a-114n) to the subscriber devices 110a-110n and/or the user communication devices 112a-112n. The server 120 may be configured to generate interfaces (e.g., graphical user interfaces) based on stored data for the subscriber devices 110a-110n. For example, the server 120 may generate data to implement an interface, the data may be sent to the subscriber devices 110a-110n, the subscriber devices 110a-110n may interpret the data to generate a user interface, the user may interact with the user interface to provide requests, the subscriber devices 110a-110n may transmit the requests to the server 120 and the server may process the requests. Similarly, the capture devices 100a-100n and/or the user communication devices 112a-112n may interpret data from the server 120 to implement an interface. The processing capabilities and/or functionality of the server 120 may be varied according to the design criteria of a particular implementation.

The server 120 may comprise a block (or circuit) 120. The circuit 120 may implement a database (e.g., a remote database). The database 130 may store data and/or filter the stored data in response to search parameters. Details of the database 130 may be described in association with FIG. 2. Generally, the database 130 may store data provided by the capture devices 100a-100n. In an example, the database 130 may store the metadata. Search parameters may be transmitted by the subscriber devices 110a-110n and the database 130 may be searched based on the search parameters. For example, the database 130 may enable the metadata to be associated with the video data stored by (and located on) the capture devices 100a-100n.

The system 50 may be configured to provide a searchable, real time database of roadway video. In an example, the system 50 may be implemented to assist in time-critical challenges (e.g., AMBER alerts, roadway crime, asset recovery, auto insurance investigation, etc.). The system 50 may implement a "Big Data" approach to providing and/or searching captured video and/or metadata.

The system 50 may be implemented using inexpensive cameras 100a-100n to program participants (e.g., the users and/or the data producers). The data producers may install the capture devices 100a-100n. For example, the data producers may install the capture devices 100a-100n on vehicles as dashcams. The capture devices 100a-100n may provide the benefits of a security camera and/or a dashboard camera to the data producers (e.g., security, video evidence, video data for uploading to video services such as YouTube, etc.). In some embodiments, the system 50 may determine an amount of video recorded and provide rewards (e.g., perks) to the data producers (e.g., discounts on the capture devices 100a-100n).

The data producers may use the capture devices 100a-100n to collect and/or upload video metadata to the server 120 (e.g., for storage in the database 130). For example, the video metadata may be uploaded via the user communication devices 112a-112n. The data producers may provide the recorded video to the server 120 on demand. The data producers may be compensated on an ongoing basis for providing the video metadata and/or the recorded video. In one example, the data producer may receive a payment for providing and/or making a pre-determined amount of recorded video available. In another example, the data producer may receive a payment each time one of the video recordings is requested.

The video metadata may be accumulated in the remote database 130. For example, the database 130 may be curated. The video metadata may be made available through a web interface to subscribers (e.g., the data consumers). The subscribers may use the subscriber devices 110a-110n to access the database 130. The database 130 and/or the server 120 may enable the subscribers to search the database 130 using search parameters. In one example, the interface may provide a map overlay (e.g., based on data presented by the server 120) that the subscriber may interact with on the subscriber devices 110a-110n to provide the search parameters. In another example, the subscriber may specify search parameters such as a location, a time of an incident and/or license plate data. The database 130 may perform a search of the metadata to determine whether any of the video metadata matches the search parameters.

The database 130 may provide the search results. The interface generated on the subscriber devices 110a-110n may provide the subscriber with a list of videos that match the search results communicated by the server 120. The subscriber may request available recorded video files for a given event. If a subscriber requests one of the video files, a request may be sent to the server 120. The server 120 and/or the database 130 may determine which of the capture devices 100a-100n captured the video based on the video metadata (e.g., the metadata may comprise an ID of a camera and/or user that captured the video). The server 120 may send a request to the user communication devices 112a-112n and/or the capture devices 100a-100n to upload the recorded video. If the capture devices 100a-100n still have the requested video stored, a video upload may be initiated. The recorded video may be trickled (e.g., uploaded as a low priority data transfer) from the corresponding one of the capture devices 100a-100n, through the corresponding one of the user communication devices 112a-112n and to the internet 60. In some embodiments, the recorded video may be buffered on one of the user communication devices 112a-112n until particular conditions are met for uploading the video recording (e.g., until a Wi-Fi connection is available). The server 120 may notify the subscriber that the video is available for download. An account of the data producer that uploaded the video may be credited in response to the video upload.

The system 50 may enable data provider users to access the database 130. The data provider users may feed the database 130 in real time with video metadata. The system 50 may enable the subscriber users to search the database 130. When the database 130 determines there is a hit for a search request, the system 50 may allow the subscriber to get access to the video metadata and/or the video recording.

The capture devices 100a-100n may be implemented with inexpensive hardware powerful enough to perform video analytics (e.g., license plate recognition (LPR)). The video analytics may be performed in real time, while capturing the video data. In one example, the capture devices 100a-100n may be sold with a low margin to encourage wide adoption of the device so that many users may be the data providers to capture large amounts of video data for the system 50. Since data providers may be compensated for providing the video data and/or video metadata, the data providers may have the ability to turn the capture devices 100a-100n into a money making tool. For example, in the system 50 the drivers may own the capture devices 100a-100n and use them to make money (e.g., similar to how an Uber, Lyft or other ridesharing service drivers own a vehicle and use the vehicle to make money).

The database 130 may be implemented to receive video metadata, index the metadata and/or provide responses to search requests in real time. In some embodiments, the database 130 may store video recordings. Generally, the video metadata (e.g., plate number, GPS coordinates, time, etc.) is uploaded via the user communication devices 112a-112n without the corresponding recorded video (e.g., the metadata may be uploaded before the video data is uploaded). If one of the subscriber users requests a recorded video file corresponding to the video metadata, the system 50 may enable the video data to be uploaded to the metadata server 120 (e.g., data may be uploaded as a low-priority data transfer). The recorded video data may have a limited time frame of availability. In one example, the capture devices 100a-100n may be configured to overwrite stored video as new video data is captured (e.g., a loop recording). In an example of 40 hours of driving per week with the capture devices 100a-100n implementing a 128 GB SD card and recording at 10 Mbit/s, the recorded video may be overwritten in approximately 3.5 days. When a video expires (e.g., is overwritten), the video metadata stored in the database 130 may still provide useful information to the subscriber user (e.g., which vehicles were in a particular area at a particular time).

The video metadata and/or the recorded video may provide useful information to the subscriber users. In one example, the system 50 may be helpful in an AMBER Alert situation. In another example, video evidence may be provided to insurance companies involved with a given auto accident. Different viewpoints and/or camera angles may be used to determine the circumstances that led up to an accident. In yet another example, the system 50 may save many government agencies (e.g., Department of Transportation) a tremendous amount of money in planning infrastructure (e.g., to limit infrastructure development and/or expand infrastructure development based on driving habits). In still another example, the system 50 may provide investigative departments (e.g., Department of Justice, local police, highway patrol, homeland security, etc.) with more information (e.g., post-mortem incident investigation).

Generally, the provider of the system 50 may not capture any video data. The video data may be captured by the data providers that have purchased (or otherwise received) the capture devices 100a-100n. The provider of the system 50 may curate the resulting data generated by the data providers.

Figure 2:
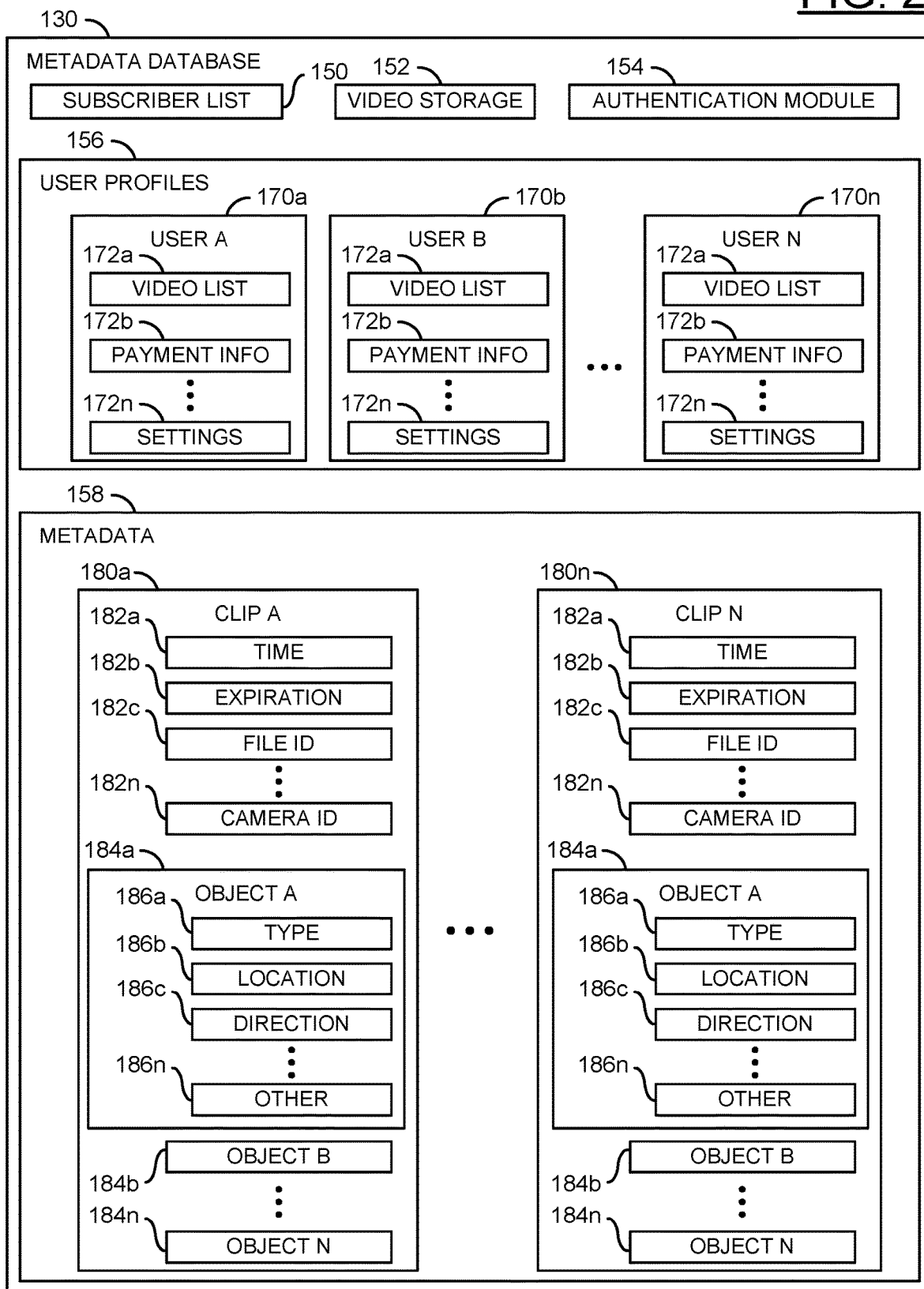
FIG. 2 is a diagram illustrating a block diagram representing data sets stored in a database.

Referring to FIG. 2, a diagram illustrating a block diagram representing example data sets stored in the database 130 is shown. The database 130 may comprise a block (or circuit) 150, a block (or circuit) 152, a block (or circuit) 154, a block (or circuit) 156 and/or a block (or circuit) 158. The block 150 may comprise a subscriber list. The block 152 may comprise video storage. The block 154 may comprise an authentication module. The block 156 may comprise user profiles. The block 158 may comprise plate and/or object metadata. The database 130 may comprise other blocks (or data sets). The implementation of the database 130 may be varied according to the design criteria of a particular implementation.

The subscriber list 150 may be configured to store information about the subscriber users. The subscriber list 150 may provide an account for each subscriber user. For example, a log in with password may be implemented by the app 114a to enable the subscriber user to access the database 130 from the subscriber device 110a. The subscriber list 150 may enable the system 50 to accept payment from subscriber users that request video data (e.g., store payment information, process payment information, etc.). The subscriber list 150 may implement individual settings, configurations and/or notifications for each of the subscriber users.

The video storage 152 may store recorded video data. In some embodiments, the data providers may upload the recorded video data to the database 130 when requested by the subscriber users. The database 130 may provide storage (e.g., temporary hosting) of the recorded video data to enable the subscriber user to download the requested video data. In some embodiments, peer-to-peer data transfers may be implemented to share the recorded video data (e.g., the database 130 may not store the recorded video data). Generally, the recorded video uploaded from the capture devices 100a-100n may be stored by the server 120.

The authentication module 154 may be configured to provide security for the data stored in the database 130. The authentication module 154 may be configured to prevent unauthorized access to the database 130. In one example, the authentication module 154 may be implemented as a username and password. For example, the user communication devices 112a-112n may provide credentials to the database 130 to upload the video metadata and/or the recorded video. In another example, two-factor authentication may be implemented by the authentication module 154. For example, the subscriber user may log in using the subscriber devices 110a-110n by providing a username, a password, and an additional key (e.g., a text message with a passcode provided to the smartphone 110a). The implementation of the authentication module 154 may be varied according to the design criteria of a particular implementation.

For example, users on the subscriber list 150 may be authorized users of the database 130. Generally, not all users have access to the database 130. The authentication module 154 may implement a heavy layer of security for the subscriber users and/or the data provider users to log onto the system 50. Since the database 130 may store privacy information (e.g., license plate data, location information, credit card information, banking information, etc.) the database 130 may be secured with a traditional approach and then have a second layer of security added. Security may be provided even if the implementation of the authentication module 154 adds inconvenience to the users.

The user profiles 156 may store data corresponding to the data provider users. The user profiles 156 may comprise blocks (or circuits) 170a-170n. The blocks 170a-170n may comprise the data provider profiles. Each of the data provider profiles 170a-170n may store information corresponding to an individual data provider. Each of the data provider profiles 170a-170n may comprise blocks (or circuits) 172a-172n. The blocks 172a-172n may be configured to store data sets for the data providers 170a-170n.

The data sets 172a-172n may facilitate access to the database 130 for each of the data provider users. In an example, the data set 172a may store a video list. The video list 172a may comprise a list of videos that have been recorded by a particular data provider. For example, the video list 172*a* may be used to send a request to the capture devices 100*a*-100*n* and/or the user communication devices 112*a*-112*n* to upload the recorded video data. In another example, the video list 172*a* may be used to provide a payment to the particular data provider that captured the requested video data. In an example, the data set 172*b* may store payment information. The payment information 172*b* may associate credit card, electronic payment (e.g., PayPal, Bitcoin, Apple Pay, Google Wallet, etc.) and/or bank information with a particular one of the data provider users. The payment information 172*b* may be used to facilitate payments to the data provider that has uploaded a requested recorded video.

In some embodiments, the data provider may receive one of the capture devices 100*a*-100*n* in exchange for providing the payment information 172*b* and if enough video data is provided (e.g., provided on a consistent basis) the data collector user may not be charged. If the capture device is not used enough (or not used regularly, a charge may be incurred (e.g., due to inactivity). In an example, the data provider may receive one of the capture devices 100*a*-100*n* free of charge and be able to use the camera as a regular dashcam as well as for providing data for the system 50. In one example, the data provider may not be charged for one of the capture devices 100*a*-100*n* for the first 90 days and if data is provided to the system 50 during the first 90 days no charge will be incurred. To avoid a situation where a freeloader receives the camera for free and uses the camera with the system 50 for a minimum threshold amount to avoid a fee and then stops providing data to the system 50, the payment information 172*b* may be stored to charge a penalty fee to encourage the data provider to provide data.

In an example, the data set 172*n* may comprise user settings. The user settings 172*n* may provide a configuration and/or preferences for each of the data providers 170*a*-170*n*. The data sets 172*a*-172*n* may store other information (e.g., a user name, a profile picture, a data usage plan of the data provider, etc.). In an example, the data usage plan may provide details of a carrier (e.g., 3G/4G/LTE/5G provider) to manage data transmission (e.g., prefer transferring large files over Wi-Fi instead of a limited data plan). The amount and/or type of data stored in the data sets 172*a*-172*n* of each of the data provider profiles 170*a*-170*n* may be varied according to the design criteria of a particular implementation.

The metadata 158 may store information about various captured videos (e.g., video clips) 180*a*-180*n*. The video clips 180*a*-180*n* may not be the actual video data (e.g., the actual video data may be stored with the video storage 152). The video clips 180*a*-180*n* may comprise information about the video clips and/or information about objects detected in the video clips by the capture devices 100*a*-100*n*.

In some embodiments, each video clip metadata 180*a*-180*n* that is captured and/or uploaded by the capture devices 100*a*-100*n* may be stored by the database 130. The video data associated with the video clip metadata 180*a*-180*n* may be stored in the video storage 152. Generally, the video data in the video storage 152 may be stored temporarily. For example, video data may have a relatively large file size and storing video data indefinitely may be impractical. However, the video clip metadata 180*a*-180*n* may have a much smaller file size than the video data. The video clip metadata 180*a*-180*n* may be configured to provide sufficient information about the video data to re-create the positioning of various objects in the video data even after the video data is no longer available.

Every time video data is uploaded to the database 130, the corresponding video metadata 180*a*-180*n* may be stored by the database 130. The video metadata 180*a*-180*n* may be stored long-term compared to the video data. In some embodiments, the metadata 158 may be organized by detected objects instead of the video clip metadata 180*a*-180*n*. In one example, where the objects detected are license plates, each time a license plate is detected a new metadata entry may be created. For example, each of the license plate entries may comprise the associated clips 180*a*-180*n*. The clips 180*a*-180*n* may comprise metadata entries for each time a license plate has been read by one of the capture devices 100*a*-100*n*. For example, each time a license plate is detected, a new one of the clips 180*a*-180*n* may be appended to the corresponding one of the license plate entries. Similarly, if the objects detected are vehicles then the video clips 180*a*-180*n* may be associated with a particular vehicle. The arrangement of the metadata 158 may be varied according to the design criteria of a particular implementation.

Each video clip 180*a*-180*n* is shown comprising metadata 182*a*-182*n*. The clip metadata 182*a*-182*n* may comprise the data extracted by the capture devices 100*a*-100*n* from the video recorded by the capture devices 100*a*-100*n* and/or data associated with the video recorded by the capture devices 100*a*-100*n*. The video clip metadata 182*a*-182*n* may be configured to provide useful information about the video clips that have been uploaded.

In one example, the video clip metadata 182*a* may comprise a time. The time 182*a* may indicate a date and/or time of day when the corresponding video was recorded (e.g., a timestamp). The time 182*a* may be used to find recorded video that occurred at a particular time. In another example, the video metadata 182*b* may comprise an expiration flag. The expiration flag 182*b* may indicate whether or not the recorded video is still available (e.g., stored in the memory of the capture device, stored in the video storage 152, has not been overwritten, etc.). For example, the expiration flag 182*b* may have a particular value (e.g., a logical one value) if the video has been overwritten. If the expiration flag 182*b* indicates that the recorded video is no longer available, the video clip metadata 180*a*-184*n* may still provide useful information. The video clip metadata 182*c* may provide a file ID. The file ID 182*c* may be used to associate the video clip metadata 180*a*-180*n* to a particular stored video file (e.g., either in the video storage 152 and/or in the memory of the cameras 100*a*-100*n*). For example, if the expiration flag 182*b* indicates the video data is still available then the file ID 182*c* may be used to retrieve the video data. The video clip metadata 182*n* may provide a camera ID. The camera ID 182*n* may be used to associate the video clip metadata 180*a*-180*n* to a particular one of the cameras 100*a*-100*n* (e.g., the camera that captured the video data associated with the metadata). The camera ID 182*n* may enable the video data to be retrieved from the capture devices 100*a*-100*n* (if the video is still available) and/or to enable the data provider to be contacted for more information (or provide payment to the data provider user). The number and/or type of video clip metadata 182*a*-182*n* available may be varied according to the design criteria of a particular implementation.

The video clip metadata 180*a*-180*n* may comprise a number of objects 184*a*-184*n*. The objects 184*a*-184*n* may correspond to each object detected using the video analysis performed by the capture devices 100*a*-100*n*. In one example, the object 184*a* may be a particular vehicle detected in the video data. In another example, the object

184*b* may be a particular pedestrian detected in the video data. In yet another example, the object 184*c* may be a license plate detected in the video data. In still another example, the object 184*n* may be a particular sign and/or landmark detected in the video data. The number and/or types of objects 184*a*-184*n* stored with the video clip metadata 180*a*-180*n* may be varied according to the design criteria of a particular implementation.

Each of the objects 184*a*-184*n* may have associated object information 186*a*-186*n*. In an example, the object information 186*a* may correspond to an object type (e.g., a person, a vehicle, a building, a sign, a billboard, a license plate, etc.). The object type 186*a* may provide details about the associated objects 184*a*-184*n*. In one example, if the object is a vehicle, the object type 186*a* may indicate the make, model, year, color, license plate, number of passengers, distinctive markings, etc. The object information 186*b* may correspond to a location. The location 186*b* may comprise GPS coordinates corresponding to the object in the recorded video. The location 186*b* may be used to find recorded video that was captured at a particular location (e.g., at an intersection at a particular time). In some embodiments, the location 186*b* may comprise an absolute location of the objects 184*a*-184*n*. For example, the absolute location 186*b* may be determined by the video analysis performed by the capture devices 100*a*-100*n* to determine the actual coordinates of the objects detected instead of merely the GPS coordinates of the capture devices 100*a*-100*n*. In some embodiments, the location 186*b* may be the location of the object within the video frame (e.g., the distance of the object from the camera lens determined by the capture devices 100*a*-100*n* using video analysis).

The object information 186*c* may comprise a direction. In some embodiments, the direction 186*c* may indicate the direction of travel of the objects 184*a*-184*n* (or if the objects 184*a*-184*n* are stationary). For example, the direction 186*c* may be determined by the capture devices 100*a*-100*n* analyzing a sequence of video frames to determine where the object is moving over time. In some embodiments, the direction 186*c* may be the direction that the capture device 186*a*-186*n* was facing when the video data was captured. For example, the information from the location 186*b* and the direction 186*c* may be combined to determine the absolute location coordinates of the objects 184*a*-184*n*. Other types of metadata 186*n* may be stored about the objects 184*a*-184*n*. The types and/or amount of object information 186*a*-186*n* may be varied according to the design criteria of a particular implementation.

The information stored about the video clips 180*a*-180*n* may be used to identify vehicles, times, locations and/or other data about the recorded videos. The video clip metadata 180*a*-180*n* may be the data checked by the database 130 to determine results for a search query from the subscriber users. The video metadata 180*a*-180*n* may be used to approximate what may be recorded and/or visible when viewing the corresponding recorded video. The storage format for the metadata 158 may be implemented to enable re-enact and/or re-creating a scene (e.g., the vehicle locations) after the video data has expired (e.g., re-creating the arrangement of the objects when the video data is no longer available).

The circuits 102*a*-102*n* may be configured to perform object detection and/or video analysis to determine and/or recognize details of an object (e.g., of objects other than license plates). For example, in some video scenes, license plates may not be visible (e.g., the license plate is obstructed and/or not clear enough for optical character recognition).

The circuits 102*a*-102*n* may be configured to determine roadway data in real time. In one example, the object information 186*a*-186*n* may store information corresponding to a type of vehicle detected (e.g., color of a car, make of a vehicle, model of a vehicle, year of a vehicle, speed of a vehicle, etc.). In another example, the object information 186*a*-186*n* may comprise roadway data (e.g., a lamp post detected, a street sign detected, a shape of a roadway detected, conditions of the road detected, etc.).

The database 130 may be configured to index the video metadata and/or associate new video metadata with license plate numbers and/or objects in real time. The database 130 may arrange the data to enable efficient filtering of information to provide fast search results for the subscriber users. In the example shown, the metadata 158 is arranged according to the video clips 180*a*-180*n*. In another example, the metadata 158 may be arranged based on a time, a location, a camera ID, etc.). The arrangement of the storage of the data in the database 130 may be varied according to the design criteria of a particular implementation.

The database 130 may be configured to create a database entry for each incoming video clip. In one example, the video metadata 182*a*-182*n* for the clip 180*a* may comprise information such as id="1", lp="5SAM333", date="20170307", time="14:30", alt="141.46354", lat="37.804440" and/or lng="−122.422874". In another example, the video metadata 182*a*-182*n* for the clip 180*i* may comprise information such as id="2", lp="5SAM333", date="20170307", time="14:32", alt="142.13576", lat="37.804643" and/or lng="−122.420899". The database 130 may receive a large amount of data collected from various data provider users in a short amount of time. The database 130 may be constantly (e.g., continually, regularly, periodically, etc.) sorting the received data in order to serve up results to the subscriber users on the web interface. For example, the database may implement one file for each license plate 180*a*-180*n* to avoid parsing all stored data in order to filter out license plate results in real time.

Figure 3:
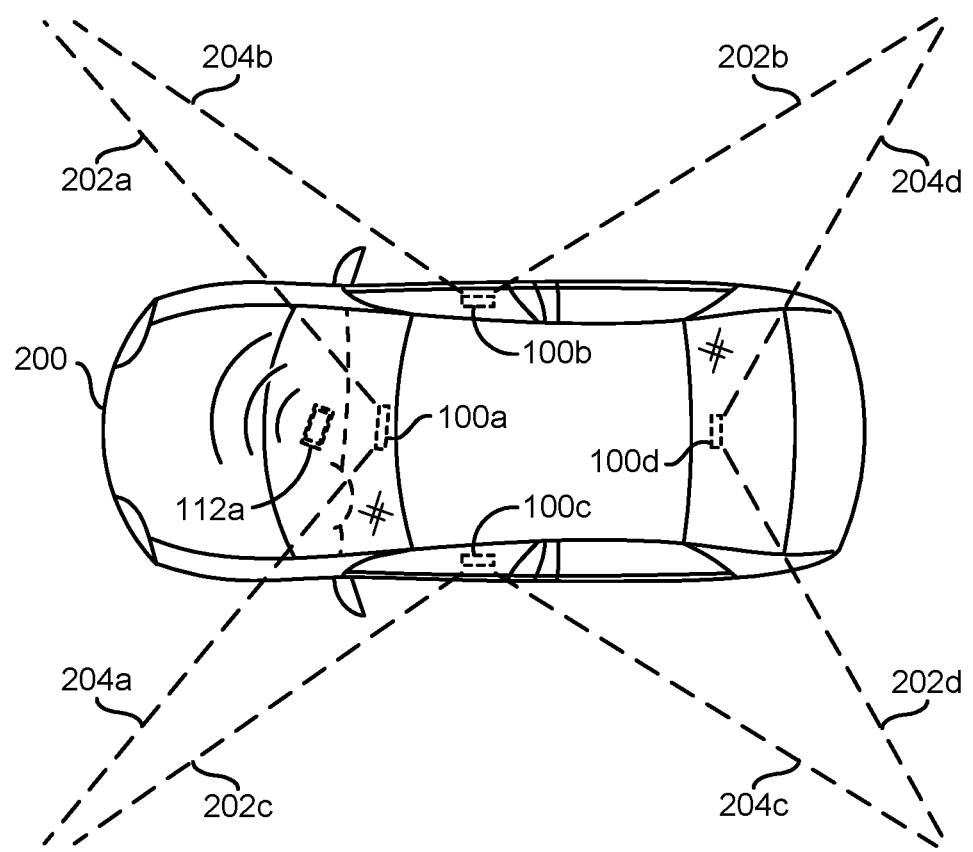
FIG. 3 is a diagram illustrating capturing video data from vehicle-mounted cameras.

Referring to FIG. 3, a diagram illustrating capturing video data from vehicle-mounted cameras is shown. A vehicle 200 is shown. The vehicle 200 may be a vehicle of a data provider (e.g., a data provider vehicle). The vehicle 200 may comprise a number of the capture devices 100*a*-100*n*. In the example shown, the capture device 100*a* may be installed facing the direction of travel of the vehicle 200, the capture device 100*b* may be installed directed away from a passenger side of the vehicle 200, the capture device 100*c* may be installed directed away from a driver side of the vehicle 200 and the capture device 100*d* may be installed directed facing opposite from the direction of travel of the vehicle 200.

The user communication device 112*a* is shown in the vehicle 200. In the example shown, the user communication device 112*a* may be a smartphone communicating to the network 60 (e.g., via a 3G/4G/LTE/5G wireless connection). For example, each of the installed cameras 100*a*-100*d* may communicate with the smartphone 112*a* (e.g., creating a local network) and the smartphone 112*a* may communicate with the external network 60. In the example shown, the capture devices 100*a*-100*d* may be positioned on the windows of the front, side and back of the vehicle 200 (e.g., suction cupped from the inside of the vehicle 200). The number, installation and/or locations of the capture devices 100*a*-100*n* in a vehicle may be varied according to the design criteria of a particular implementation and/or a preference of the data provider.

A line 202*a* and a line 204*a* are shown extending from the capture device 100*a*. The line 202*a* and the line 204*a* may represent a field of view captured by the capture device 100a. The field of view of the capture device 100a may record video of a view from the front of the vehicle 200 (e.g., from a perspective of a front of the vehicle 200). A line 202b and a line 204b are shown extending from the capture device 100b. The line 202b and the line 204b may represent a field of view captured by the capture device 100b. The field of view of the capture device 100b may record video of the view from the right of the vehicle 200 (e.g., from a perspective of a passenger side of the vehicle 200). A line 202c and a line 204c are shown extending from the capture device 100c. The line 202c and the line 204c may represent a field of view captured by the capture device 100c. The field of view of the capture device 100c may record video of the view from the left of the vehicle 200 (e.g., from a perspective of a driver side of the vehicle 200). A line 202d and a line 204d are shown extending from the capture device 100d. The line 202d and the line 204d may represent a field of view captured by the capture device 100d. The field of view of the capture device 100d may record video of the view from the rear of the vehicle 200 (e.g., from a perspective of a back of the vehicle 200).

The vehicle 200 may have a number of the capture devices 100a-100n installed. In the example shown, four of the capture devices 100a-100n may be installed. For example, the cameras may be directed for a "drive mode" (e.g., the camera 100a directed forward, and the camera 100d directed backwards) and the cameras may be directed for a "trawl mode" (e.g., the camera 100b and the camera 100c each directed sideways). For example, the trawl mode may be useful when in parking lots. The number of the capture devices 100a-100n installed on the vehicle 200 may be varied according to the design criteria of a particular implementation.

Figure 4:
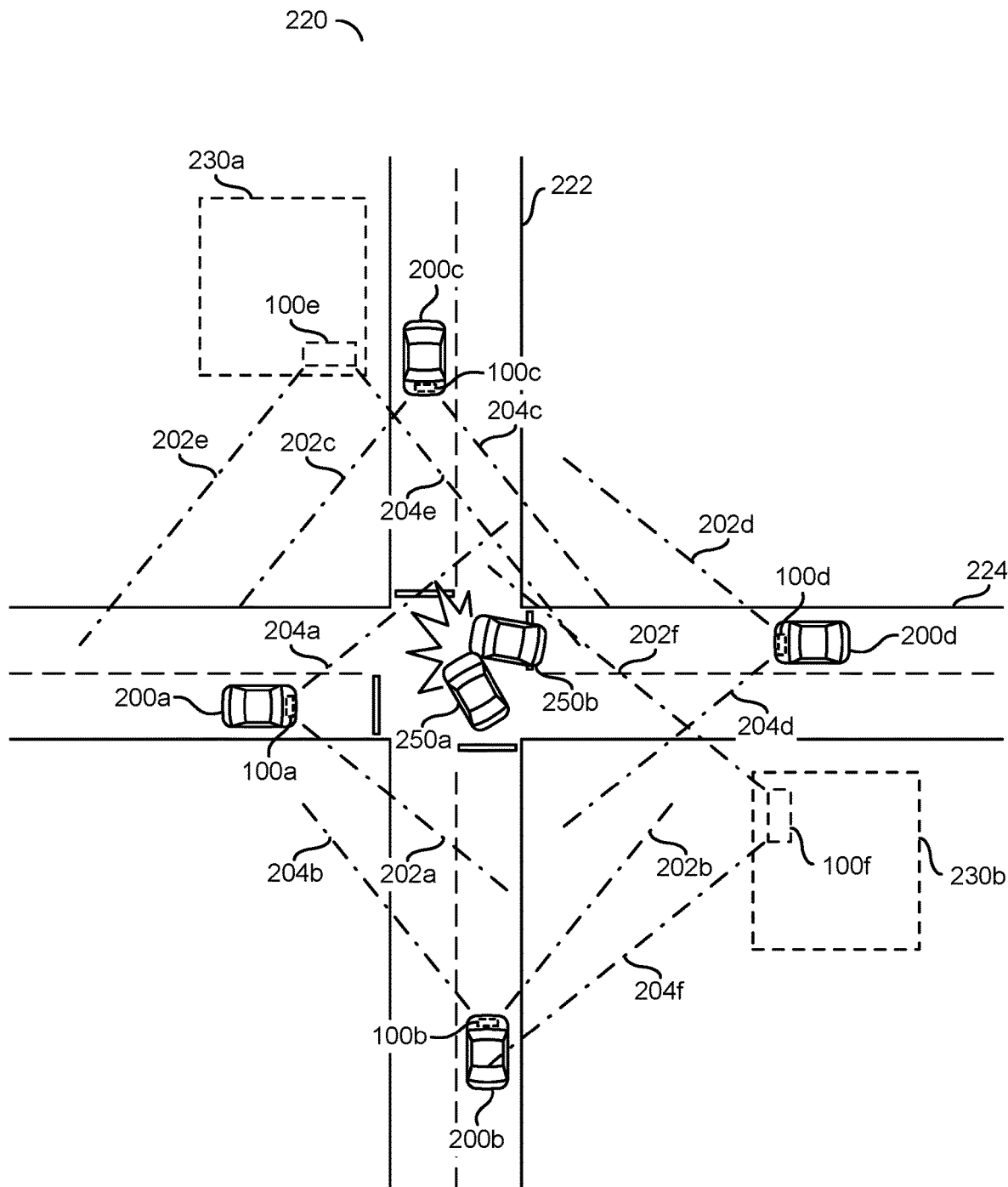
FIG. 4 is a diagram illustrating multiple vehicles capturing video footage of an event.

Referring to FIG. 4, a diagram illustrating multiple vehicles capturing video footage of an event 220 is shown. The event 220 may be a collision at an intersection of a road 222 and a road 224. A vehicle 250a and a vehicle 250b are shown colliding. The drivers of the vehicle 250a and the vehicle 250b may use the system 50 as subscriber users. For example, the subscriber users that drive the vehicle 250a and the vehicle 250b (or insurance companies representing the drivers of the vehicle 250a and/or the vehicle 250b to determine fault) may want video evidence from different viewpoints of the collision (e.g., to aid in resolving insurance claims that may arise as a result of the event 220).

The vehicle 200a may have the capture device 100a installed, the vehicle 200b may have the capture device 100b installed, the vehicle 200c may have the capture device 100c installed and/or the vehicle 200d may have the capture device 100d installed. The drivers of the vehicle 200a, the vehicle 200b, the vehicle 200c and/or the vehicle 200d may be data providers. A building 230a and a building 230b are shown. The building 230a may have the capture device 100e installed and the building 230b may have the capture device 100f installed as a security camera. In some embodiments, one or more of the capture devices 100a-100n may be implemented as stationary cameras. The owner of the building 230a and the owner of the building 230b may be data providers for the system 50 (e.g., capture video of the event 220).

The capture device 100a may capture one field of view (e.g., the line 202a and the line 204a) from the viewpoint of the vehicle 200a. The capture device 100b may capture one field of view (e.g., the line 202b and the line 204b) from the viewpoint of the vehicle 200b. The capture device 100c may capture one field of view (e.g., the line 202c and the line 204c) from the viewpoint of the vehicle 200c. The capture device 100d may capture one field of view (e.g., the line 202d and the line 204d) from the viewpoint of the vehicle 200d. The capture device 100e may capture one field of view (e.g., the line 202e and the line 204e) from the viewpoint of the building 230a. The capture device 100f may capture one field of view (e.g., the line 202f and the line 204f) from the viewpoint of the building 230b. The various fields of view may provide video metadata and/or video recordings from different viewpoints.

The database 130 may receive metadata corresponding to the video data captured by the capture devices 100a-100f of the event 220. For example, the database 130 may receive six different user IDs of the data provider users. The database 130 may receive six slightly different GPS coordinates corresponding to the different locations of the cameras 100a-100f. In some embodiments, the database 130 may receive the same timestamp from each of the capture device 100a-100f. In some embodiments, the timestamp may be slightly different because the video files may be stored as video clips having a pre-determined time (e.g., 2 minute video clips) and the start and end time of each video clip may depend on when the cameras 100a-100f were booted up (e.g., when the vehicles 200a-200d were started). In some embodiments, system 50 may be configured to synchronize the time on each of the capture devices 100a-100n (e.g., to ensure the timestamp for a start and end time of each video clip matches between the capture devices 100a-100n). The database 130 may receive up to 6 different direction metadata information. In some embodiments, multiple clips 180a-180n with metadata information 182a-182n and/or object information 186a-186n for each object detected may be received (e.g., depending on the length of the event 220).

The video metadata from each of the cameras 100a-100f may be uploaded to the database 130. Since two vehicles (e.g., 250a-250b) are in the car accident, the database 130 may associate at least the objects 184a-184b with two license plates and/or vehicle type entries (e.g., 184a for the vehicle 250a and 184b for the vehicle 250b). Depending on the fields of view, some of the cameras 100a-100n may not capture both license plates and/or vehicles (e.g., the field of view of the camera 100b may capture the license plate of the vehicle 250a but not capture the license plate of the vehicle 250b). License plate entries may be made for the data provider vehicles 200a-200d (e.g., the capture device 100a may capture the license plate of the vehicle 200d). Additional license plate and/or vehicle entries may be made for other objects and/or vehicles captured (e.g., the capture device 100b may capture the colliding vehicles 250a-250b as well as the vehicle 200a).

The metadata 158 may be extracted from the video data captured by each of the capture devices 100a-100n. The video metadata 158 may be associated with the video clips 180a-180n corresponding to each field of view captured. In one example, the video clip 180a may correspond to the metadata associated with the video data captured by the capture device 100a. In another example, the video clip 180b may correspond to the metadata associated with the video data generated by the capture device 100b. In one example, the object 184a may correspond with the vehicle 250a captured by the capture device 100a and associated with the video clip 180a and the object 184b may correspond to the vehicle 250b captured by the capture device 100a and associated with the video clip 180a. In another example, the object 184a may correspond with the vehicle 250b captured by the capture device 100b and associated with the video clip 180b and the object 184b may correspond to the vehicle 250*a* captured by the capture device 100*b* and associated with the video clip 180*b*. The subscriber users may use the subscriber devices 110*a*-110*n* (e.g., via the app and/or web interface 114*a*) to search the metadata 184*a*-184*n* to view any videos that may have been captured of the event 220.

In some embodiments, the capture devices 100*a*-100*n* may implement Wi-Fi communication (e.g., to transmit the metadata and/or the recorded videos to the network 60). Implementing the Bluetooth communication to transfer data between the capture devices 100*a*-100*n* and the user communication devices 112*a*-112*n* may be useful in the vehicles (e.g., 200*a*-200*d*) to forward metadata and/or recorded videos to the network 60. In some embodiments, the capture devices 100*a*-100*n* may implement Wi-Fi functionality to connect to access points that may be fixed (e.g., Wi-Fi hotspots, home networks, business networks, etc.). For example, if someone had a storefront or house that overlooked the intersection (or any field of view where license plate recognition and/or other type of roadway metadata extraction could be performed on passing vehicles), the cameras 100*a*-100*n* could be placed to face out a window of a home and/or business (e.g., similar to a consumer IP camera). Connecting the capture devices 100*a*-100*n* to a Wi-Fi access point may enable the cameras 100*a*-100*n* to operate like a consumer IP Camera but additionally provide the video clip metadata 180*a*-180*n* (e.g., by receiving payments from the system 50 in exchange for providing the video metadata, the cost of a security camera for the business may be subsidized). Similarly, a business operating a fleet of vehicles (e.g., taxi drivers, delivery drivers, drivers of a car-sharing company, etc.) may install the capture devices 100*a*-100*n* in an existing fleet of vehicles and make a small profit over time by receiving payments from the system 50 by being a data provider (and use the video data like an ordinary dash camera for post mortem analysis of any crash involving a vehicle from the fleet).

If the subscriber user (e.g., the driver of the vehicle 250*a*, the driver of the vehicle 250*b*, an insurance company representing the drivers of the vehicles 250*a*-250*b*, and/or another user) searches the video clips 180*a*-180*n* in the database 130, a list of videos of the event 220 may be provided. If the subscriber user decides to request a video recording of the event, the server 120 may send a request to one or more of the capture devices 100*a*-100*n* (or the associated user communication device 112*a*-112*n*). The circuits 102*a*-102*n* may set a flag for the requested video in response to the request from the server 120. Setting the flag for the requested video may be used to preserve the requested video recording (e.g., prevent the video from being over-written). The capture devices 100*a*-100*n* and/or the user communication devices 112*a*-112*n* may upload the video data to the server 120. In some embodiments, the associated video may be preserved for all data points that may be returned as search results of a search query. For example, the server 120 may send the request to one or more of the capture devices 100*a*-100*n* (or the associated user communication device 112*a*-112*n*) to preserve the video data associated with the search results so that the video data may be preserved in order to be made available if the subscriber user later decides to request the video data. The flag may be set for a pre-determined amount of time before the video is unflagged (e.g., to prevent storage of video data indefinitely).

In some embodiments, the video recording may be flagged for preservation in response to a request from a subscriber user. In some embodiments, the system 50 may send a request to all capture devices 100*a*-100*n* that have video data from a particular time and a particular location. For example, an event may occur that may be considered important (e.g., a VIP such as a celebrity is at a location, a crime has been committed, a gunshot was reported, a blast was reported, etc.). When a particular event has been determined to have occurred, all cameras 100*a*-100*n* in the vicinity may start preserving data. In one example, if the VIP event is happening presently, the video data being currently recorded may be preserved. In another example, the video data currently residing in the memory of the capture devices 100*a*-100*n* associated with the time of the event may be preserved (e.g., a crime is reported after the event occurs and later an interrupt request is provided to the capture devices 100*a*-100*n* to preserve potential evidence).

In some embodiments, the video metadata 182*a*-182*b* and/or the object information 186*a*-186*n* associated with each of the objects 184*a*-184*n* may enable the event 220 to be re-created, even if the video data is no longer available (e.g., expired, over-written, etc.). For example, the object information 186*a*-186*n* may be used for each of the objects 184*a*-184*n* of each of the video clips 180*a*-180*n* associated with the event 220 (e.g., based on a timestamp and/or general location) to determine the absolute location of each of the vehicles 200*a*-200*d* and/or the colliding vehicles 250*a*-250*b*. Even if the video data is no longer available, the object information 186*a*-186*bn* may provide detailed absolute coordinate information over a sequence of time. For example, the detailed absolute coordinate information may be used to indicate where each of the colliding vehicles 250*a*-250*b* were before, during and after the event 220. For example, by analyzing the absolute location coordinates over a sequence of time, the speed, direction of travel, the timing of the event 220 and/or other information about the colliding vehicles 250*a*-250*b* may be determined to re-create the event 220.

Figure 5:
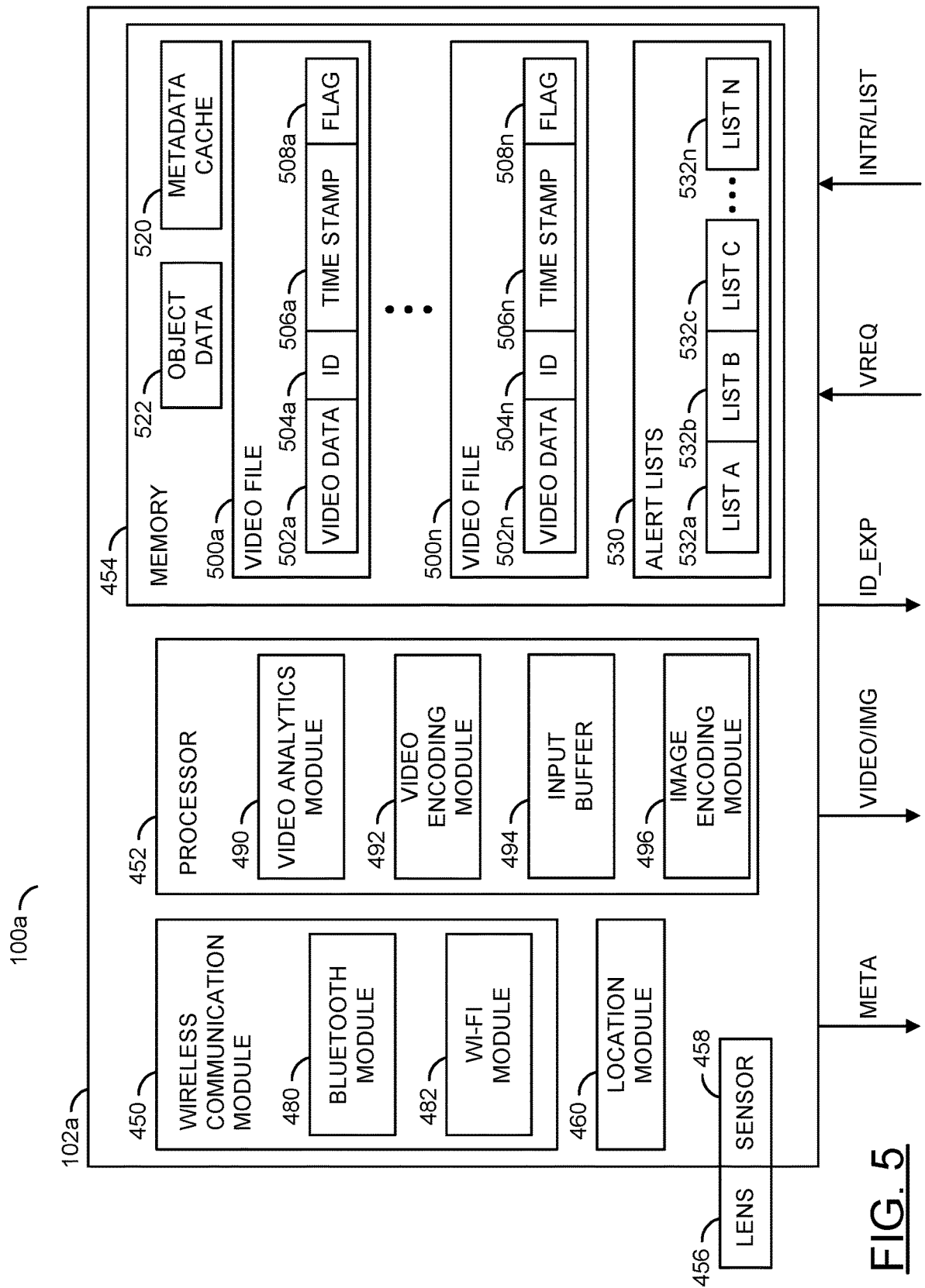
FIG. 5 is a diagram illustrating example components of a capture device.

Referring to FIG. 5, a block diagram illustrating an example implementation of the circuit 102*a* configured to perform the functionality of a vehicle-mounted camera 100*a*. The capture device 100*a* may be a representative example of one of the capture devices 100*a*-100*n*. The capture device 100*a* may comprise the circuit 102*a*. In some embodiments, the circuit 102*a* may be a main printed circuit board for the capture device 100*a*. In some embodiments, the circuit 102*a* may comprise various circuit boards, daughter boards and/or modules. For example, the circuit 102*a* may comprise multiple printed circuit boards connected using cables. In another example, the circuit 102*a* may comprise input/output slots configured to connect to drop in components (e.g., off-the-shelf components). Generally, the circuit 102*a* may be designed to fit a space and/or heat dissipation specification for the capture device 100*a*.

The circuit 102*a* may comprise a block (or circuit) 450, a block (or circuit) 452, a block (or circuit) 454, a block (or circuit) 456, a block (or circuit) 458 and/or a block (or circuit) 460. The block 450 may implement a wireless communication module. The block 452 may implement a processor. The block 454 may implement a memory. The block 456 may implement a lens module. The block 458 may implement a camera sensor module. The block 460 may implement a location module (e.g., a GPS/GNSS module and/or a magnetometer). The circuit 102*a* may comprise other components (not shown). For example, the circuit 102*a* may comprise a firmware, input/output ports, memory expansion slots, a battery, a power adapter (for connection to an external power supply), etc. The components of the circuit 102*a* may be varied according to the design criteria of a particular implementation.

The circuit 102a is shown presenting a signal (e.g., META), a signal (e.g., VIDEO/IMG) and/or a signal (e.g., ID_EXP). The circuit 102a is shown receiving a signal (e.g., VREQ) and/or a signal (e.g., INTR). The circuit 102a may present the signal META, the signal VIDEO/IMG and/or the signal ID_EXP to a corresponding one of the user communication devices 112a (e.g., a paired wireless communication device). The circuit 102a may receive the signal VREQ and/or the signal INTR from the user communication device 112a.

The wireless communication module 450 may be configured to implement one or more wireless communication protocols. The wireless communication module 450 may be configured to transmit data and/or receive data. For example, the wireless communication module 450 may enable the circuit 102a to communicate with one or more of the user communication devices 112a-112n and/or the network 60. In the example shown, the wireless communication module 450 may comprise a block (or circuit) 480 and/or a block (or circuit) 482. The block 480 may implement a Bluetooth module. The block 482 may implement a Wi-Fi module. The wireless communication module 450 may comprise other components (not shown). For example, the wireless communication module 450 may comprise a module configured to implement 3G/4G/LTE/5G communication. The implementation of the wireless communication module 450 may be varied according to the design criteria of a particular implementation.

The Bluetooth module 480 may be configured to implement Bluetooth communication. For example, the Bluetooth module 480 may be configured to pair the circuit 102a with the user communication device 112a. The Bluetooth module 480 may enable a transfer of the video data and/or the metadata from the circuit 102a to the user communication device 112a. The Bluetooth module 480 may enable a short-range and/or low-power communication.

The Wi-Fi module 482 may be configured to implement Wi-Fi communication. In some embodiments, the Wi-Fi module 482 may be configured to connect to a local and/or wide area network. In some embodiments, the Wi-Fi module 482 may be configured to create a local network and other devices (e.g., the user communication device 112a) may connect to the Wi-Fi module 482. The Wi-Fi module 482 may enable wireless communication of the video data and/or the metadata. In some embodiments, the Wi-Fi module 482 may be configured implement a mesh network with other Wi-Fi modules. For example, the Wi-Fi module 482 implemented in the capture device 100a may form a mesh network with other nearby Wi-Fi module(s) 482 in the capture devices 100b-100n. Implementing a mesh network may enable the circuits 102a-102n to communicate using an ad-hoc Wi-Fi network as vehicles move around. For example, one or more of the data provider users may have a desired connectivity to the network 60 (e.g., sufficient upload bandwidth, sufficient data quota with the service provider, an unlimited data plan, etc.). Other data provider users that do not have the desired connectivity to the network 60 may use the mesh network to utilize the connectivity to the network 60 of data provider users that do have the desired connectivity to the network 60. The mesh network may help more of the data provider users to have reliable access to the network 60.

The processor 452 may be configured to read, write and/or process data, perform calculations and/or execute computer readable instructions. The processor 452 may implement one or more processing cores to enable parallel processing. The processor 452 may be implemented using various architectures (e.g., x86/x64, ARM, etc.). In some embodiments, the processor 452 may be a Tensor processing unit configured for deep machine learning. The processor 452 may be configured to perform various types of operations (e.g., a general purpose processor). In some embodiments, the processor 452 may implement various hardware modules configured to implement specific tasks. In the example shown, the processor 452 may comprise a block (or circuit) 490, a block (or circuit) 492, a block (or circuit) 494 and/or a block (or circuit) 496. The block 490 may comprise a video analytics module. The block 492 may comprise a video encoding module. The block 494 may comprise an input buffer. The block 496 may comprise an image encoding module. The processor 452 may comprise other types of modules (not shown). For example, the processor 452 may further comprise an encryption module. The implementation of the processor 452 may be varied according to the design criteria of a particular implementation.

The video analytics module 490 may be configured to perform real-time video analytics on the captured video data. The video analytics module 490 may be configured to extract the metadata in response to the video analytics. The video analytics module 490 may be configured to scan visual data present in each video frame captured by the capture device 100a. In some embodiments, the video analytics module 490 may implement optical character recognition. In some embodiments, the video analytics module 490 may be configured to detect and/or classify objects detected in the video data. For example, the video analytics module 490 may compare features of the captured video frames to known features (e.g., templates) to identify an object captured in the video frame as a particular type of object (e.g., identify a vehicle as a particular make, model and year of a vehicle). The type of video analytics performed by the video analytics module 490 may be varied according to the design criteria of a particular implementation.

In some embodiments, the analytics performed by the video analytics module 490 may comprise determining characteristics of roadway features and/or objects. The metadata generated by the video analytic module 490 may be used as training data sets for machine learning. In one example, the capture devices 100a-100n may be implemented as dashboard cameras (e.g., dashcams) and the images captured may comprise various roadway data. The video analytics module 490 may analyze many images of various roadways and/or obstacles (e.g., curves, lane markings, curbs, street signs, traffic lights, license plate styles, road markings, pedestrians, vehicle types, vehicle makes, vehicle models, road hazards (e.g., snow, ice, flooding, chemical spills, etc.), construction barriers, etc.). The large amounts of metadata produced by the video analytics module 490 may provide many sample images and/or metadata of roadway data and/or object data. The data generated by the video analytics module 490 may be used to generate feature templates to improve detection when video analytics is performed (e.g., provide a greater data set to compare against). In an example, the metadata generated by the video analytics module 490 may be combined with data from other sensors (e.g., LIDAR, GPS and/or other sensors used to gather roadway data) for machine learning for autonomous driving.

In some embodiments, the analytics performed by the video analytics module 490 may comprise determining a distance of various detected objects from the lens 456. The video analytics module 490 may be configured to compare the sizes of objects detected in the video data with known object sizes. The video analytics module 490 may be configured to determine a region of a license plate, and compare the detected plate characters with the size of the license plate characters for the detected region (e.g., or vehicle type for vehicles such as motorcycles that have smaller plates). The video analytics module 490 may be configured to detect the corners of objects (e.g., such as the corners of a license plate) to determine a size of the detected object.

In some embodiments, the analytics performed by the video analytics module 490 may be configured to account for (e.g., normalize) objects that are at an angle to determine the size of the detected objects. For example, relationships between various portions of an object may be analyzed to determine an orientation of an object (e.g., rotated, at an angle, slanted, skewed, etc.). The video analytics module 490 may be configured to correct distortion caused by the lens 456. For example, de-warping may be performed to correct distortions caused by a wide (e.g., fisheye) lens.

The video analytics module 490 may comprise a number of libraries each configured to recognize various types of objects. Each of the libraries may be specialized and/or customized for detecting specific types of objects. In one example, one of the libraries may be configured to detect and/or identify vehicles in the captured video frames. In another example, one of the libraries may be configured to recognize street signs. In yet another example, one of the libraries may be configured to perform OCR for license plate reading. The libraries may be third party modules for recognizing objects that may be divided into discrete tasks. Different libraries may be provided by different vendors (e.g., each vendor may specialize in a particular area of object detection). The different libraries may run sequentially or in parallel and operate on different parts of the video frame stored in the input buffer 494.

The video encoding module 492 may be configured to encode and/or decode the captured video data. Encoding and/or decoding the captured video may compress the video data to enable more video data to be stored in the memory 454. The encoding and/or decoding performed by the video encoding module 492 may be lossless and/or lossy compression. The video encoding module 492 may perform the encoding on the captured video data in real-time. For example, the video encoding module 492 may implement encoding such as h.264, h.265, VP8, VP9, Daala, etc. The type of encoding implemented by the video encoding module 492 may be varied according to the design criteria of a particular implementation.

The input buffer 494 may be a memory configured to provide temporary storage for newly captured video data. The video data 494 may be in the input buffer while the video analytics module 490 performs the video analysis in real time and/or the video encoding module 492 performs the encoding operations to store the video data in the memory 454. The input buffer 494 may be configured to limit the amount of spatial data used from an input video frame as input to the buffer used for video analytics. By limiting the amount of spatial data input to the working buffer the inherently limited system resources of the real time system may allocated more efficiently. The input buffer 494 may temporarily store a subset of the captured video frame.

The image encoding module 496 may be configured to encode and/or decode (e.g., convert) the captured video frames as still images. The image encoding module 496 may be configured to encode still images from the data stored in the input buffer 494. Encoding and/or decoding the captured video frames may compress the video frame to enable efficient storage of the still images (e.g., pictures) in the memory 454. The encoding and/or decoding performed by the image encoding module 496 may be lossless and/or lossy compression. The image encoding module 496 may perform the encoding on the captured video frames in real-time. For example, the image encoding module 496 may implement image formats such as JPEG, BMP, PNG, WebP, SVG, etc. The type of encoding implemented by the image encoding module 496 may be varied according to the design criteria of a particular implementation.

The memory 454 may be configured to store data. The memory 454 may comprise a solid state memory (e.g., NAND flash). In some embodiments, the memory 454 may comprise memory onboard the circuit 102a and/or external memory (e.g., a microSD card). The memory 454 may comprise blocks (or circuits) 500a-500n, a block (or circuit) 520, a block (or circuit) 522 and/or a block (or circuit) 530. The blocks 500a-500n may each implement storage of a video file. The block 520 may implement a metadata cache. The block 522 may implement object data. The block 530 may implement local alert list storage. The memory 454 may comprise other data (not shown). For example, the memory 454 may further comprise a firmware. The type of memory implemented by, the data arrangement of and/or the data stored by the memory 454 may be varied according to the design criteria of a particular implementation.

The video files 500a-500n may comprise the captured and/or recorded video. Each of the video files 500a-500n may comprise storage locations for a video clip (e.g., a discrete video recording and/or a video segment). In some embodiments, the video files 500a-500n may represent video clips having a same length (e.g., 2 minute video clips). In some embodiments, the video files 500a-500n may represent video clips (or segments) having different lengths (e.g., based on a storage size of each video file). Each video file storage location 500a-500n may comprise a corresponding one of blocks (or circuits) 502a-502n, blocks (or circuits) 504a-504n, blocks (or circuits) 506a-506n and/or blocks (or circuits) 508a-508n. The blocks 502a-502n may comprise the video data. The blocks 504a-504n may comprise the video ID. The blocks 506a-506n may comprise a time stamp. The blocks 508a-508n may comprise a flag. The video files 500a-500n may comprise other data (not shown). The type of data stored and/or the arrangement of data stored in the video files 500a-500n may be varied according to the design criteria of a particular implementation.

The video data 502a-502n may comprise the viewable captured video. The video data 502a-502n may be the data transmitted in response to a request from the subscriber user. The video data 502a-502n may be encoded by the encoding module 492 before the video files 500a-500n are created.

The video ID 504a-504n may comprise an identification for the video files 500a-500n. The video ID 504a-504n may be implemented as a data string comprising alphanumeric characters (e.g., a hash). The video ID 504a-504n may represent a portion of the metadata associated with the video files 500a-500n. The video ID 504a-504n may be used by the database 130 to locate and/or match the metadata clips 180a-180n to a particular one of the video files 500a-500n.

The time stamp 506a-506n may comprise an indication of when the video files 500a-500n have been recorded. The time stamp 506a-506n may comprise a data string. For example, the time stamp 506a-506n may indicate a year, a month, a date, a day of the week, an hour, a minute, seconds, fractions of a second, etc. The time stamp 506a-506n may represent a portion of the metadata associated with the video files 500a-500n. The time stamp 506a-506n may be used by the processor 452 to determine which of the video files 500a-500n is the oldest. The time stamp 506a-506n may be used by the processor 452 to determine an order that the video files 500a-500n were recorded, based on time.

The flags 508a-508n may be used to indicate whether the video file 500a-500n may be overwritten. The flags 508a-508n may represent one or more preservation bits for the video files 500a-500n. In one example, when one of the flags 508a-508n is set (e.g., to indicate the file should be preserved) by the capture devices 100a-100n, the corresponding one of the video files 500a-500n may not be overwritten. In another example, when one of the flags 508a-508n is not set (e.g., to indicate the file should not be preserved), the corresponding one of the video files 500a-500n may be made available to be overwritten (e.g., by a new video file).

In some embodiments, the flags 508a-508n may be implemented using a single bit. In some embodiments, multiple bits may be used for each of the flags 508a-508n. In one example, when using multiple bits for the flags 508a-508n, a condition for determining how long to preserve the video files 500a-500n may be set (e.g., an amount of time, a particular date, an occurrence of an event, etc.). In another example, when multiple bits are used for the flags 508a-508n, different lengths of time to preserve the video files 500a-500n may be set based on a reason for preserving the video files 500a-500n (e.g., preserve video files for 3 days if a video is the result of a subscriber search, preserve video files indefinitely if the video is evidence, preserve video files one week if an event was captured, etc.). In yet another example, when multiple bits are used for the flags 508a-508n, the bits may represent an amount of time to preserve the video files 500a-500n based on a value of a subscriber user and/or subscription tier (e.g., a subscriber user paying a higher fee may result in a value of 5 being stored for the flags 508a-508n to indicate preservation for 5 days, a subscriber user paying a lower fee may result in a value of 2 being stored for the flags 508a-508n to indicate preservation for 2 days, etc.). Generally, a user that does not have a subscription to access the database 130 (e.g., a user that is not a subscription user) may not receive search results from the database 130 (e.g., the database 130 may not generate search results and/or may not allow a search query if a user is not one of the subscriber users). In some embodiments, the processor 452 may use the flags 508a-508n to decide when to overwrite the video files 500a-500n (e.g., compare the creation date of the video files 500a-500n plus the flag value to the current date). The implementation of the flags 508a-508n may be varied according to the design criteria of a particular implementation.

The metadata cache 520 may be configured to store the metadata extracted by the video analytics module 490 and/or any other metadata corresponding to the captured video data 502a-502n. The metadata cache 520 may provide temporary storage. Generally, the metadata may not be stored long-term by the memory 454. For example, the metadata may be deleted after being successfully stored by the database 130 as the metadata 158. Temporarily storing the metadata may increase an amount of the memory 454 available for storing the video files 500a-500n. Some of the metadata may be stored long-term by the memory 454 (e.g., the video ID 504a-504n and/or the time stamp 506a-506n). The metadata cache 520 may provide storage for the metadata until the metadata is uploaded to the database 130. In some embodiments, when the database 130 communicates that the metadata for a particular one of the video files 500a-500n has been successfully stored, the metadata cache 520 may purge the corresponding metadata. Generally, the metadata files may be created in the metadata cache 520, filled with metadata, compressed, encrypted, transferred to the user communication devices 112a-112n, and then deleted from the metadata cache 520 (e.g., after a confirmation of successful upload to the database 130 has been received).

The object data 522 may comprise information about known objects. The information about known objects may be used to identify, detect, and/or compare objects in the video data 502a-502n. In one example, the object data 522 may comprise a database of vehicle makes, models, years, colors, sizes, dimensions, etc. In another example, the object data 522 may comprise regional information about license plates (e.g., shape, size, font, character size, design for each state/country, etc.). In yet another example, the object data 522 may comprise information about signs, billboards, buildings, cell towers, and/or other objects (trees, lane dividers, pylons, pedestrians, animals, etc.).

The video analytics module 490 may be configured to compare the objects detected in the video data 502a-502n with the known object data 522. The comparison may be used to determine the distance of the detected object from the capture device 100a. For example, if the detected object is a 2018 Ford F-150, the known dimensions of a 2018 Ford F-150 in the stored in the object data 522 may be compared with the dimensions of the detected 2018 Ford F-150. Based on a size comparison of the known and detected dimensions, the distance of the 2018 Ford F-150 from the capture device 100a may be determined. In another example, if a license plate is detected as a Michigan license plate, the size of the alphanumeric plate characters may be compared to the known size of characters for Michigan license plates to determine the distance of the license plate from the capture device 100a. The types of objects and/or information about objects stored in the object data 522 may be varied according to the design criteria of a particular implementation.

In some embodiments, the object detection may be performed in real-time and the distance calculations for the detected objects may be performed later. In an example, the object data 522 may not have the capacity to store known characteristics of all objects. For example, if the dimensions of the 2018 Ford F-150 are not currently stored in the known object data 522, the size comparison may be delayed. In an example, the capture device 100a may send a request to the user communication device 112a to retrieve dimensions for the 2018 Ford F-150. When the information becomes available to the capture device 100a, the size comparison may be performed.

The lens module 456 may be configured to focus light onto the camera sensor 458. The lens module 456 may comprise mechanisms for zooming, panning, tilting, focusing, adjusting a DC iris, etc. The camera sensor 458 may be configured to convert the light from the lens module 456 into images. The images generated by the camera sensor 458 may be the video frames of the captured video data. The video frames generated by the camera sensor 458 may be processed by the processor 452 to generate the captured video.

The location module 460 may be configured to calculate location coordinates. In an example, the location module 460 may be a GPS/GNSS module. The location module 460 may be configured to communicate with the GPS/GNSS satellites, receive data from the GPS/GNSS satellites and/or perform calculations on the data from the GPS/GNSS satellites to determine the current location of the capture device 100a. The location module 460 may comprise a magnetometer in order to calculate a direction of travel and/or a direction the capture device 100a is facing. The direction of travel and/or direction the capture device 100a is facing may be a numerical representation of a direction and/or angle. In some embodiments, if the magnetometer is not available the previous GPS coordinates may be used to infer the direction of travel.

The signal META may comprise the data that may be stored by the database 130 as the metadata 158 extracted from the captured video by the processor 452. The signal META may comprise the metadata stored by the metadata cache 520. The signal META may be generated by the metadata cache 520 and transmitted to the database 130 for storage and/or indexing. The wireless communication module 450 may implement a short-range, inexpensive and/or low power consumption communications protocol (e.g., Bluetooth) to communicate with the user communication device 112a. The user communication device 112a may forward the signal META from the circuit 102a to the network 60. The network 60 may transmit the signal META to the server 120 for storage in the database 130.

The signal VIDEO/IMG may comprise the video data 502a-502n recorded by the capture device 100a and/or the circuit 102a. The signal VIDEO/IMG may be generated by the wireless communication module 450 and transmitted to the server 120 and/or one of the subscriber devices 110a-110n. The signal VIDEO/IMG may comprise one or more components (e.g., the signal VIDEO and the signal IMG may be separate signals and/or signal components). The signal VIDEO/IMG may comprise the still images (e.g., pictures) generated by the image encoding module 496. The wireless communication module 450 may implement a short-range, inexpensive and/or low power consumption communications protocol (e.g., Bluetooth) to communicate with the user communication device 112a. The user communication device 112a may forward the recorded video to the network 60.

Transmitting the video data 502a-502n to the subscriber users may be a low-priority data transfer. One of the flags 508a-508n corresponding to the video file 500a-500n being transferred may be set to ensure the video file 500a-500n is preserved at least until the data transfer is completed. Generally, the transfer of the signal VIDEO may not be initiated by the circuit 102a until the subscriber user requests the video. For example, if a user does not request a recorded video, the video file may eventually be overwritten by the capture device 100a. Since the recorded video is not transmitted until requested, unnecessary transfer and/or storage of data may be reduced.

The signal ID_EXP may comprise a notification (e.g., a flag) indicating that one of the video files 500a-500n stored by the memory 454 has expired (e.g., has been overwritten). The signal ID_EXP may comprise the video ID 504a-504n corresponding to the video files 500a-500n that has been overwritten. The capture device 100a may implement loop recording and, over time, may overwrite the video files 500a-500n (e.g., the oldest video data). The signal ID_EXP may be configured to notify the server 120 and/or the database 130 that one or more of the video files 500a-500n are no longer available. For example, the video ID 504a-504n may match the video file ID 182c stored as part of the metadata 158 to create a relationship between the video files 500a-500n stored in the memory 454 and the metadata 158 stored in the database 130. The signal ID_EXP may be generated by the wireless communication module 450 and transmitted to the database 130 for storage and/or indexing. For example, information transmitted by the signal ID_EXP may be stored as the expiration status flag metadata 182b in the clips 180a-180n (e.g., the metadata 158 may be updated in response to the notification to indicate that the portion of the video data corresponding to the signal ID_EXP may no longer be available). When the signal ID_EXP is received and when the corresponding video is requested, the server 120 may provide metadata only instead of video in response to the request from the subscriber user.

The metadata 158 stored in the database 130 may comprise the video ID 504a-504n of the corresponding video 500a-500n and/or store data used to derive the video ID 504a-504n and/or the capture device 100a-100n that stores the corresponding video file 500a-500n. For example, the metadata 158 may store the time stamp 506a-506n as the time 182a (e.g., when the first entry is inserted to the video files 500a-500n), a user ID as the camera ID 182n (e.g., to identify the user communication device 112a-112n corresponding to the capture device 100a-100n that captured the corresponding video files 500a-500n), a sequence number (e.g., a sequential number incrementing from 0 to 1029 and then looping back to 0). In one example, the metadata 158 may be a filed named "DATA-2017-03-07-14-30-00-00-01-0099.txt" (e.g., corresponding to the first timestamp and/or GPS entry deposited Mar. 7, 2017 at 2:30:00 PM by Driver ID #0001 and a sequence number of video file 0099). The contents of the file for the video clip metadata 180a-180n may comprise a sequence of lines of data. Each line of data may comprise at least a time stamp entry, a latitude and/or a longitude (e.g., 2017-03-0714:30:00, 37.804440, −122.422874, 2017-03-07 14:30:20, 37.804440, −122.422874, etc.). Some lines of data may comprise a video file name and/or status of the video file (e.g., FILE DELETED: VIDEO-2017-03-06-14-30-00-0001-0022.MP4, FILE CREATED: VIDEO-2017-03-07-14-31-40-0001-0052.MP4, etc.). The video file names of the metadata 180a-180n may correspond with the names of the video files 500a-500n. The format of the metadata clips 180a-180n stored in the database 130 may be varied according to the design criteria of a particular implementation.

The signal VREQ may comprise a request to the capture device 100a configured to initiate an upload of one of the video files 500a-500n stored in the memory 454. For example, the transfer of the signal VIDEO/IMG may be initiated in response to the processor 452 receiving the signal VREQ. The signal VREQ may be generated by one of the subscriber devices 110a-110n. The signal VREQ may be generated in response to the subscriber user requesting a particular recorded video data clip. For example, the subscriber user may perform a search of the database 130 and receive a list of results based on the stored metadata. If the subscriber user does not request a video file (e.g., no signal VREQ received), the wireless communication module 450 may not upload video data. If the subscriber user does request one of the stored video files 500a-500n, the subscriber device (e.g., 110a) may generate the signal VREQ. The server 120 may determine which of the capture devices 100a-100n has the requested video file 500a-500n (e.g., based on the video list 172a and/or the device ID 182n of the clip metadata 180a-180n). The server 120 may transmit the signal VREQ to the network 60, to the corresponding user communication device (e.g., 112a) and then to the corresponding capture device 100a. In response to the signal VREQ, the server 120 may make the requested video file available to the subscriber user.

The signal INTR may comprise an interrupt request for the capture device 100a. The interrupt request communicated by the signal INTR may be configured to provide various instructions to the processor 452. In one example, the interrupt request may be used to initiate a live streaming mode for the capture device 100a. In a live streaming mode, the signal VIDEO may be streamed as a high priority data transfer (e.g., the capture device 100a may communicate with the server 120 without using the user communication device 112a). In another example, the interrupt request may be used to initiate video storage mode (e.g., record video as a loop recording). In still another example, the signal INTR may be transmitted to stop the capture device 100a from recording. In yet another example, the signal INTR may be transmitted to check if one or more of the video files 500a-500n are available and/or unavailable (e.g., check if information stored in the database 130 is consistent). Generally, the signal INTR is implemented to provide the processor 452 with a particular instruction to execute at a particular time (e.g., to cause the capture device 100a to change behavior on demand). The type of instructions transmitted as interrupt requests by the signal INTR may be varied according to the design criteria of a particular implementation.

The signal INTR may be transmitted to indicate that a particular one of the stored video files 500a-500n should be preserved. For example, one of the video files 500a-500n should be preserved when the video recording is an output result of a search request by one of the subscriber users. The database 130 may be configured to generate search results for a subscriber user based on the metadata 158 (e.g., in response to a search query submitted using the app 114a). The search results determined by the database 130 may correspond to one or more of the video files 500a-500n (e.g., based on the video IDs stored as part of the metadata 158). The database 130 may generate the signal INTR to preserve the video files 500a-500n that correspond to the search results. The database 130 may provide the signal INTR to one or more of the capture devices 100a-100n (e.g., by communicating with a corresponding one of the user communication devices 112a-112n) based on the search results (e.g., the metadata 158 may indicate which of the capture devices 100a-100n captured a particular video file and/or which of the user communication devices 112a-112n is associated with the capture devices 100a-100n that captured the particular video file).

The signal INTR may comprise one or more of the video IDs 504a-504n. The processor 452 may match the data in the signal INTR to the video IDs 504a-504n. The processor 452 may set the flags 508a-508n corresponding to the video files 500a-500n with the matching video IDs 504a-504n. The video files 500a-500n may be preserved in response to the signal INTR.

The processor 452 may be configured to receive captured images from the sensor 458, perform video analytics using the video analytics module 490 to extract the metadata, encode the captured video using the encoding module 492 and/or store the encoded video data as the video files 500a-500n in the memory 454. The video files 500a-500n may be created in the memory 454 to implement a loop recording. The loop recording implementation may create new video files 500a-500n in available (e.g., free) space in the memory 454. For example, if the memory 454 has free space available, the newest encoded video data may be stored in the free space of the memory 454 (e.g., previously stored data may not be overwritten). When the memory 454 is filled (e.g., stored to capacity), the memory 454 may overwrite previously stored data with the new data.

Generally, a loop recording default storage implementation may overwrite the oldest data (e.g., the video files 500a-500n having the oldest/lowest time stamp 506a-506n) first. For example, if the video file 500a is written into the memory 454 first and the video file 500i is written into the last of the available free space (e.g., video files 500a-500i take up all the available free space), then the next video file 500j may overwrite the video file 500a (e.g., and subsequently the video files 500b, 500c, etc. may be overwritten by new video data). The loop recording default storage implementation may enable the video files 500a-500n to be stored in the memory 454 as portions of a continuous recording (e.g., video may be continuously captured as the vehicle 200 is being driven and the video files 500a-500n may be the continuous video segmented into shorter clips).

The flags 508a-508n may be configured to override the loop recording default storage implementation. The flags 508a-508n may indicate that one or more of the video files 500a-500n should be preserved even if the video file would be the next (e.g., oldest) file to be overwritten in the loop recording default storage implementation. For example, if the video file 500a is written into the memory 454 first and the flag 508a is set, the video file 500b is written into the memory 454 second and the flag 508b is not set and the video file 500i is written into the last of the available free space (e.g., video files 500a-500i take up all the available free space), then the next video file 500j may overwrite the video file 500b instead of the video file 500a (e.g., and subsequently the video files 500c, 500d, etc. may be overwritten unless a respective one of the flags 508a-508n has been set). Generally, the processor 452 may store the next portion of the captured video (e.g., the newest created video file 500a-500n) in an empty storage location of the memory 454 when free space is available (e.g., one or more storage locations of the memory 454 are empty), and in one of the storage locations of the memory 454 that stores the oldest portion of the captured video (e.g., overwrite one of the video files 500a-500n having the oldest time stamp 506a-506n) that does not have the flag 508a-508n set if there are no empty storage locations in the memory 454.

The flags 508a-508n may be modified to enable the video files 500a-500n to be preserved in case that one of the subscriber users decides to request one of the video files 500a-500n. The flags 508a-508n may be implemented to strike a balance between preserving the video files 500a-500n that may be potentially requested, and ensuring that the memory 454 may have space available for recording new video files 500a-500n.

In some embodiments, the flags 508a-508n may be set to preserve a corresponding one of the video files 500a-500n when the database 130 selects the corresponding one of the video clips 180a-180n as the search result(s) in response to a search query from the subscriber users (e.g., sent using the app 114a on the subscriber devices 110a-110n). For example, from the search results of the query, the database 130 may identify the video ID(s) and/or the ID of the capture device(s) 100a-100n for the video clips 180a-180n based on the metadata 158. The database 130 may transmit the signal INTR to the capture device(s) 100a-100n corresponding to the ID of the capture device stored in the metadata 158. The signal INTR may identify the video IDs 504a-504n corresponding to the search result. When the signal INTR is received by the corresponding one of the circuits 102a-102n, the processor 452 may match the video IDs 504a-504n with the video files 500a-500n stored in the memory 454 and set (e.g., modify) the corresponding one of the flags 508a-508n to preserve the video. The flags 508a-508n may be set to preserve the video files 500a-500n when the metadata 158 corresponds to the search result determined by the database 130 (e.g., a request for the video files 500a-500n may not be needed for preservation). By preserving the video files 500a-500n in response to a match to a search query by the subscriber user, the system 50 may preserve the video files 500*a*-500*n* in the event that the subscriber user later decides to request the video file (e.g., the corresponding video file 500*a*-500*n* may be available when the signal VREQ is received). In some embodiments, the preserved video files 500*a*-500*n* may not be requested and to prevent any unnecessary use of data (e.g., data usage limits imposed by internet and/or cellular communication providers) the signal VIDEO may not be uploaded until formally requested by the subscriber user. The video files 500*a*-500*n* may be requested by the subscriber users using the app 114*a*.

In some embodiments, the flags 508*a*-508*n* may be set to preserve a corresponding one of the video files 500*a*-500*n* when an event has been determined to have occurred within a range of the capture devices 100*a*-100*n*. When an event has been determined to occur (e.g., a pre-scheduled notification to the system 50, a notification from police, a notification from news reporters, notifications from insurance investigators, etc.), the location and/or a time may be presented to the database 130 (e.g., similar to a search query from the subscriber users). In an example, when the event is pre-scheduled, the processor 452 may store the recorded video files 500*a*-500*n* that correspond to the event with the flags 508*a*-508*n* set to preserve. In another example, when the event is determined after the event has occurred, the database 130 may search the metadata 158 to determine the clips 180*a*-180*n* that match the event (e.g., a location, a time, a person of interest, a vehicle of interest, etc.). When the clips 180*a*-180*n* that match the event are found, the database 130 may find the video ID and/or the ID of the capture devices 100*a*-100*n* that potentially captured the event. The signal INTR may be sent to the capture devices 100*a*-100*n* that potentially captured the event, and the flags 508*a*-508*n* may be modified (e.g., set) for the video files 500*a*-500*n* that match the video IDs 504*a*-504*n* of the signal INTR. The flags 508*a*-508*n* may be set to preserve the video files 500*a*-500*n* when the metadata 158 corresponds to the event, even if the video has not been requested. By preserving the video files 500*a*-500*n* in response to a match of the event, the system 50 may preserve the video files 500*a*-500*n* in case that the video files 500*a*-500*n* are requested later.

Generally, the signal INTR may be sent to the capture devices 100*a*-100*n* to preserve the video files 500*a*-500*n* that have been captured within a range of the event by modifying the flags 508*a*-508*n*. In some embodiments, the range of the event may correspond to location coordinates and/or a time. When an event occurs, a notification may be sent (e.g., the signal INTR) to all capture devices 100*a*-100*n* storing video files 500*a*-500*n* with GPS tags (e.g., the location 186*b*) within the bounds of the locality where the event occurred. In one example, the event may be a person of interest (e.g., a wanted criminal, a missing person, a celebrity, etc.). In another example, the event may be a crime (e.g., a stolen vehicle, a shooting, an explosion, etc.). In yet another example, the event may be a natural phenomenon (e.g., an eclipse, extreme weather such as a hurricane, flooding, lightning, etc.). In still another example, the event may be a something known in advance (e.g., a parade, a ceremony, a celebration, a sports competition, etc.) and/or something not known ahead of time (e.g., an accident, an incident, a calamity, a catastrophe, a mishap, a phenomenon, etc.).

In some embodiments, the event may be conditions used for machine learning for autonomous driving (e.g., deep learning). For example, to provide training data for machine learning, particular situations, environments and/or circumstances may need to be analyzed. The processor 452 may be configured to identify particular situations, environments and/or circumstances. For example, if more training data is requested for blizzard (or flooding, or hail) conditions, the event may be when there is a blizzard (or flood, or hail) outside. In another example, if more training data is requested for identifying a type of animal, the event may be when an animal is detected. In yet another example, if more training data is requested for particular types of roadways, the event may be when pre-determined road conditions are detected. The conditions for an event may be varied according to the design criteria of a particular implementation.

When the flags 508*a*-508*n* are modified to preserve the video files 500*a*-500*n*, the video files 500*a*-500*n* may be preserved for a pre-determined amount of time. For example, when the flags 500*a*-500*n* are implemented as a single bit, the single bit may represent the pre-determined amount of time (e.g., one week). In another example, when the flags 500*a*-500*n* are implemented as multiple bits, the multiple bits may represent an amount of time to preserve the video (e.g., the bits may be encoded to represent time). Limiting the amount of time that the video files 500*a*-500*n* may be preserved may ensure that memory space is available for recording new video data (e.g., if too many videos are preserved, new videos may not be recorded). Limiting the amount of time that the video files 500*a*-500*n* may be preserved may prevent against malicious attacks and/or spam bots (e.g., prevent attacks that request all videos to prevent new data from being recorded).

In some embodiments, the pre-determined amount of time for preserving the video files 500*a*-500*n* may be configured to comply with local legislation. For example, privacy laws may limit data retention. In some embodiments, the processor 452 may determine a location of the capture device 100 and adjust the length of time for preservation based on the legislation of the region. The pre-determined amount of time for preserving the video files 500*a*-500*n* may be configured to be updated. For example, as legislation is adjusted, introduced and/or repealed and/or new court decisions are provided, the pre-determined amount of time may be updated to comply with the latest legislation. The pre-determined amount of time may be varied according to the design criteria of a particular implementation. In some embodiments, the video files 500*a*-500*n* and/or the metadata 158 may be purged to comply with the law. In some embodiments, the video files 500*a*-500*n* may have a default amount of time set to purge the data from the memory 454. The default amount of time to purge the data may be selected arbitrarily and/or based on the design criteria of a particular implementation.

In some embodiments, the signal INTR to preserve one or more of the video files 500*a*-500*n* may be received by the user communication device 112*a*-112*n* of the driver when the driver is not operating the vehicle (e.g., the capture device 100*a*-100*n* may not be powered on and/or communicating). The interrupt signal INTR may be queued by the user communication device 112*a*-112*n* (e.g., stored in memory) and transmitted to the capture device 100*a*-100*n* when the two units (e.g., the capture device 100*a*-100*n* and/or the user communication device 112*a*-112*n*) are both powered up and in proximity of each other. For example, there may be a delay between the database 130 sending the interrupt signal INTR and the capture devices 100*a*-100*n* receiving the information to preserve the video files 500*a*-500*n*. Generally, the capture device 100*a*-100*n* may not be in operation without a paired user communication device 112*a*-112*n* companion and data may not be overwritten.

In some embodiments, the system 50 may be implemented to aid in one or more of asset recovery (e.g., locating an asset with a large number of GPS data points from the metadata 158), roadway investigation (e.g., video evidence for post mortem analysis of roadway events), motor vehicle theft (e.g., real time location of stolen vehicles), locating a person of interest and/or providing roadway video for deep learning and autonomous driving training. In an example, when locating a person of interest, a person may be located based on a large number of GPS data points (e.g., the metadata 158) corresponding to the vehicle of the person of interest (e.g., often individuals are within 1000 feet of the vehicle the individual drives). In an example of providing roadway video, self-driving car developers train machine learning techniques (e.g., for deep learning) by collecting video and/or sensor streams of various scenarios and then annotate the streams (e.g., manually and/or automatically outlining and labeling various objects in each frame). In another example of providing roadway video data, an event recorded in the video files 500*a*-500*n* may comprise a particular road and/or weather type (e.g., the event may be defined as a hail storm that occurs within city boundaries, approaching a traffic signal during night, etc.). In some embodiments, the video analytics module 490 may have the ability to distinguish objects and the database 130 may be searched for video streams with particular characteristics (e.g., the hail storm). The hail storm may only last a few minutes, but assuming a large number of drivers are collecting data during the hail storm event, there may be a significant number of video streams available for download that match the criteria of a hail storm.

The memory 454 may comprise the local alert lists storage 530. The local alert lists storage 530 may comprise blocks (or circuits) 532*a*-532*n*. The blocks 532*a*-532*n* may comprise one or more local alert lists 532*a*-532*n*. The local alert lists 532*a*-532*n* may comprise information and/or search criteria corresponding to objects of interest (e.g., vehicles, people, license plates, etc.) that may be read by the cameras 100*a*-100*n*. For example, the cameras 100*a*-100*n* may comprise an API to enable search criteria from the local alert lists 532*a*-532*n* to be compatible with the metadata generated in response to the video analysis.

For example, when the database 130 detects a match between the objects and/or license plate characters in the metadata of a video and the search criteria in the global alert list provided by the subscriber, the database 130 may communicate the relevant local alert lists 532*a*-532*n* to one of the cameras 100*a*-100*n* (e.g., the camera that captured the video corresponding to the metadata and/or any other cameras in the vicinity) for local storage. When the cameras 100*a*-100*n* have the local alert lists 532*a*-532*n* stored, the processor 452 may activate a mode of operation that enables cross-referencing the captured metadata with the entries in the local alert lists 532*a*-532*n*. In one example, the cross-referencing of the objects and/or license plates detected by the video analytics module 490 to the search criteria data in the local alert lists 532*a*-532*n* may be performed in real-time.

Generally, the cameras 100*a*-100*n* may operate in a default mode of operation. In the default mode of operation the cameras 100*a*-100*n* may capture video frames, generate the video files 500*a*-500*n*, perform the video analytics (e.g., to detect objects and generate the metadata) and/or periodically upload the metadata and/or video files 500*a*-500*n* to the server 120 via the user devices 112*a*-112*n*. When the cameras 100*a*-100*n* receive one or more of the local alert lists 532*a*-532*n* (or in response to the signal INTR from the server 120), the cameras 100*a*-100*n* may operate in a cross-referencing mode of operation. Generally, the cross-referencing mode of operation may consume more power and/or demand more resources from the processor 452 (which may affect the real-time generation of the metadata). To prevent unnecessary usage of resources, the cross-referencing mode of operation may not be performed until instructed (e.g., in response to the signal INTR/LIST from the server 120).

In the cross-referencing mode of operation, the cameras 100*a*-100*n* may capture the video files 500*a*-500*n*, perform the video analytics (e.g., to detect objects and generate the metadata) and/or periodically upload the metadata and/or video files to the server 120 via the user devices 112*a*-112*n*. In the cross-referencing mode of operation, the cameras 100*a*-100*n* may be further configured to cross-reference the detected metadata generated by the video analytics module 490 with the alert lists 532*a*-532*n*. In an example, the cameras 100*a*-100*n* may be configured to balance resources to perform the cross-referencing (e.g., video encoding and/or some types of object detection may be temporarily delayed based on resource availability).

The circuit 102*a* may be further configured to receive a signal (e.g., LIST). In some embodiments, the signal LIST may be communicated along with the signal INTR (e.g., as the signal INTR/LIST). In some embodiments, the signal INTR and the signal LIST may be communicated separately. The signal LIST may provide the cameras 100*a* with the local alert lists 532*a*-532*n*.

Figure 6:
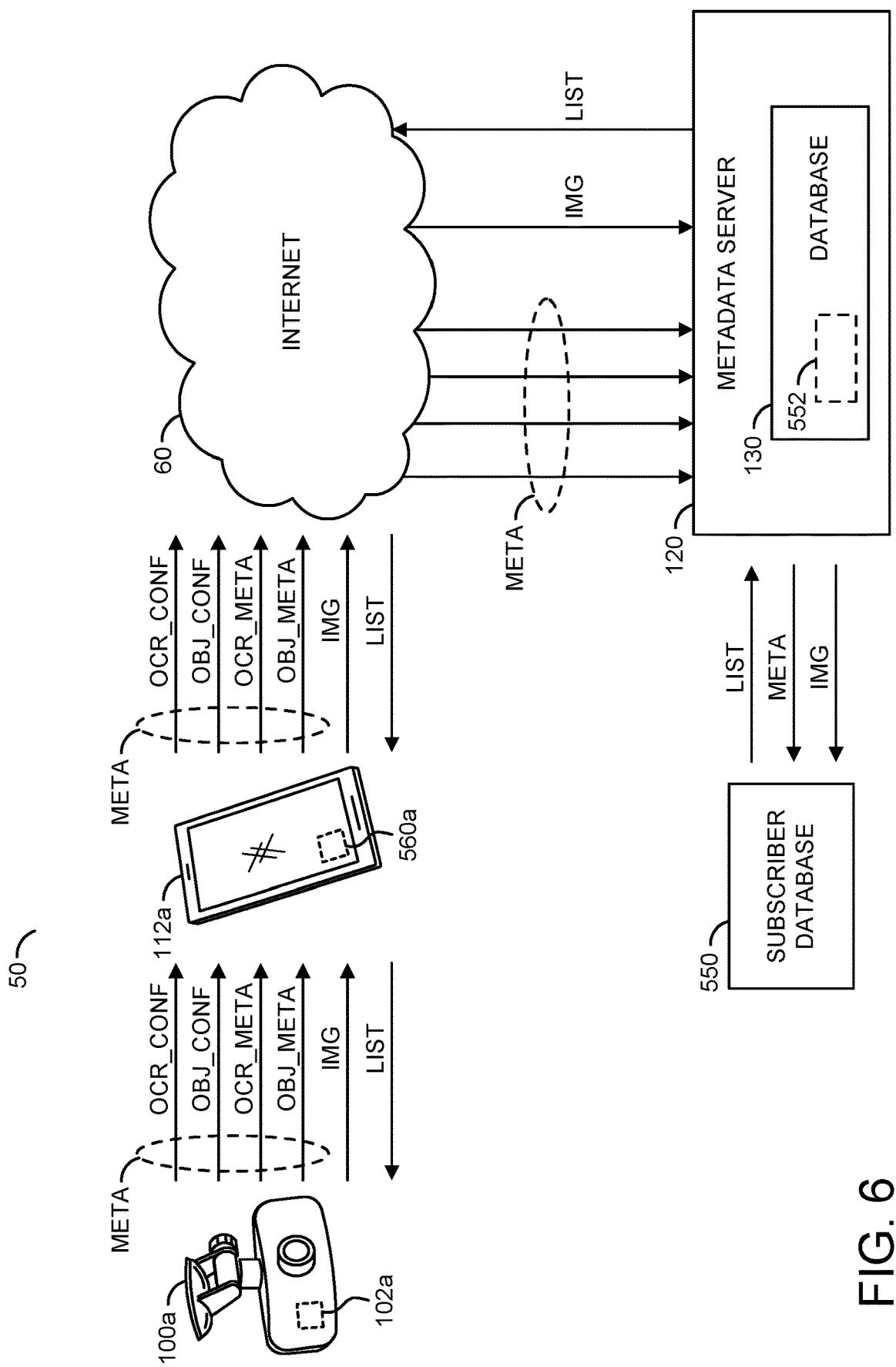
FIG. 6 is a diagram illustrating communication between a database, a capture device via a wireless communication device and an alert list subscriber.

Referring to FIG. 6, a diagram illustrating communication between the database 130, the capture device 100*a* via the wireless communication device 112*a* and an alert list subscriber 550 is shown. In the example shown, a portion of the system 50 comprising the capture device 100*a*, the user device 112*a*, the network 60, the server 120 and the subscriber database 550 are illustrated as a representative example. For example, the system 50 generally comprises multiple subscriber databases, capture devices 100*a*-100*n* and/or user devices 112*a*-112*n*. In the example shown, the camera 100*a* may have detected an object that corresponds to the search criteria from the subscriber 550. A number of signals are shown being communicated between the components of the system 50. The number and/or types of data transmitted in each of the signals may be varied according to the design criteria of a particular implementation.

The capture device 100*a* is shown presenting the signal META and/or the signal IMG to the user device 112*a*. The capture device 100*a* is shown receiving the signal LIST from the user device 112*a*. The capture device 100*a* may present and/or receive other signals (not shown).

The user device 112*a* is shown receiving the signal META and/or the signal IMG from the capture device 100*a* and receiving the signal LIST from the network 60. The user device 112*a* is shown presenting the signal META and/or the signal IMG to the network 60. The user device 112*a* may present and/or receive other signals (not shown).

The network 60 is shown receiving the signal META and/or the signal IMG from the user device 112*a*. The network 60 is shown receiving the signal LIST from the metadata server 120. The network 60 is shown presenting the signal LIST to the user device 112*a*. The network 60 is shown presenting the signal META and/or the signal IMG to the metadata server 120. The network 60 may present and/or receive other signals (not shown).

The server 120 is shown receiving the signal META and/or the signal IMG from the network 60. The server 120 is shown receiving the signal LIST from the subscriber database 550. The server 120 is shown presenting the signal LIST to the network 60. The server 120 is shown presenting the signal META and/or the signal IMG to the subscriber database 550. The metadata server 120 may present and/or receive other signals (not shown).

The subscriber database 550 is shown receiving the signal META and/or the signal IMG from the metadata server 120. The subscriber database 550 is shown presenting the signal LIST to the metadata server 120. The subscriber database 550 may present and/or receive other signals (not shown).

The signal META may comprise the metadata 158 (e.g., generated by the cameras 100a-100n in response to the video analysis) that may be stored and/or indexed in the database 130. The capture device 100a may implement a short-range, inexpensive and/or low power consumption communications protocol (e.g., Bluetooth) to communicate with the user device 112a. The user device 112a may forward the signal META and/or the signal IMG to the network 60. The network 60 may transmit the signal META and/or the signal IMG to the server 120 for storage in the database 130. In some embodiments, since the amount of data communicated in the signal META and/or the signal IMG may be relatively small (e.g., compared to a video file), the user device 112a may not need to wait until bandwidth and/or data usage restrictions are not in place to communicate with the network 60.

In the example shown, the signal META may comprise a signal (e.g., OCR_CONF), a signal (OBJ_CONF), a signal (e.g., OCR_META) and/or a signal (OBJ_META). The signal META may comprise other signal components (not shown). The signal OCR_CONF may represent a confidence level output corresponding to characters of any license plates detected in the captured video frames. The signal OBJ_CONF may represent a confidence level output corresponding to any objects detected in the captured video frames. The signal OCR_META may represent metadata generated by the video analytics module 490 in response to the video detection corresponding to license plates. The signal OBJ_META may represent metadata generated by the video analytics module 490 in response to the video detection corresponding to objects.

The video analytics module 490 may be configured to generate the metadata (e.g., the signal OCR_META and/or the signal OBJ_META) associated with objects detected in the video frames captured by the camera 100a. The video analytics module 490 may be further configured to provide a confidence level of the detection (e.g., OCR_CONF and/or OBJ_CONF). The confidence level may represent a likelihood that the metadata generated is correct.

In one example, if all characters of a license plate is readable, the confidence level of the OCR performed may be high. In another example, if one or more characters are obscured or appear similar to another character, the confidence level of the OCR performed may be low. In yet another example, if one of the characters is obscured, but the obscured character is clearly detectable in a previous video frame, the confidence level of the OCR performed may be high (e.g., the video analysis module 490 may use detections from previous video frames to infer results in a later video frame). Similarly, for objects detected, if a vehicle make/model is determined, the confidence level may be high. In another example, if a vehicle looks like another vehicle make/model, the confidence level may be low.

The signal IMG may be the still image captured in response to a match when cross-referencing the local alert lists 532a-532n to the objects detected in the video frames. The camera 100a may communicate the signal IMG and the system 50 may transfer the signal IMG to the subscriber database 550 for manual inspection.

The signal LIST may be the alert list search criteria transmitted from the subscriber database 550 to the database 130 and/or the camera 110a. The subscriber database 550 may represent a client that sends the alert list search criteria to the database 130. The database 130 may comprise a block (or circuit) 552. The circuit 552 may store the global alert list search criteria. When the metadata server 120 detects a match between an object detected by the capture devices 100a-100n and the global alert list search criteria, the metadata server 120 may communicate the signal LIST to the network 60. The system 50 may communicate the signal LIST to the cameras 100a-100n in the vicinity where the match was detected. The signal LIST may be stored as one or more of the local alert lists 532a-532n.

License Plate Recognition (LPR) systems may employ Optical Character Recognition (OCR) technology to read individual characters of the license plate tags. The characters may represent a combination of alpha-numeric characters along with any special shapes available by the state and chosen by the individual for vanity plates such as stars, hearts, smiley faces, etc. LPR systems may not be perfect and a variety of factors may cause imperfect scans including dirty, bent, and/or damaged plates or non-ideal capture environments such as rainy, snowy, dark and foggy climate conditions. The video analytics module 490 may generate the signal OCR_CONF as a confidence level as part of the OCR results to give an idea of the trustworthiness of the information returned.

The subscriber database 550 may provide alert lists (e.g., hot lists) comprising search criteria of a license plate tag of an automobile of interest to the database 130 where new incoming license plate captured by the cameras 100a-100n may be cross referenced in real time. When a new scan arrives that corresponds to a character string (e.g., search criteria) on the alert list, a notification may be sent to the subscriber. The notification may include the GPS co-ordinates of the scan to aid in locating the automobile or aid in locating the driver or person associated with the automobile.

The subscriber 550 may be a public entity, a private entity and/or an individual. In the example shown, one subscriber database 550 is communicating with the metadata server 120. However, multiple subscribers may provide hot lists to the metadata server 120. In one example, the subscriber may be an insurance investigator. In another example, the subscriber may be a bail bondsman and/or a creditor. In yet another example, the subscriber may be a private detective. In still another example, the subscriber may be a law enforcement agency. Each subscriber may provide one or more of the alert lists to the database. Each alert list may provide search criteria (e.g., objects and/or license plate characters). The search criteria from the alert lists may provide data that may be compared to the metadata 158 by the database 130. In one example, the database 130 may provide an API to enable the search criteria to be provided in a format readable by the database 130. As the metadata server 120 receives and/or indexes the metadata 158 (e.g., via the signal META), the metadata server 120 may compare the metadata 158 in the database 130 with the search criteria of the global alert lists 552 received via the signal LIST from the subscriber database 550. The search criteria in the global alert lists 552 stored by the database 130 may be used to search for an object, a license plate, a person, etc. In one example, the global alert list 552 may be a most wanted list provided by the police (e.g., the subscriber) and the search criteria may provide a known description of a suspect, a vehicle used by the suspect, a license plate of the vehicle, etc. In another example, the alert list may be a person of interest provided by a private investigator.

In one example, the search criteria provided in the global alert lists 552 may be used to locate a suspect that is 'on the run'. The search criteria may be used to track a person of interest (e.g., ensure a person under house arrest does not leave). In some embodiments, the subscriber may provide the global alert list 552 for proactive information gathering. For example, information about a particular person may be aggregated and/or statistical analysis of sightings captured by the cameras 100a-100n may be performed to determine likely locations that the person might be at during particular times of the day/week (e.g., if a person needs to be contacted, the database 130 may determine where the person is likely to be at a particular time). In some embodiments, the global alert list 552 may be used to establish the transmitting of notifications when a person is detected by the cameras 100a-100n going to a particular area and/or meeting with another person of interest on the global alert list 552.

In some embodiments, the system 50 may be utilized for asset management. Finding an automobile or person (or other assets) may be a valuable tool in the quest to find assets and people of interest. However, reliability may be a concern to prevent incorrect seizure of assets. The time, cost and perhaps legal implications of traveling to the location of the scan only to find that the scan was inaccurate may be significant. By providing the image data IMG to the subscriber database 550, the detected object may be analyzed manually (e.g., by a person looking at a picture). The manual inspection may prevent improper collection of assets and/or acting on objects/people that have been misidentified by the video analytics module 490.

Even when the signal OCR_CONF and/or the signal OBJ_CONF indicates a confidence level that may seem high to a layperson (e.g., 90% or 95%), the accuracy may not be adequately sufficient to deploy resources to initiate an in-person investigation at the location that the object was detected. By generating the signal IMG, a human may view the image to gain additional confidence before deploying resources.

The system 50 may comprise a large fleet of acquisition systems (e.g., the cameras 100a-100n) that may offer a massive amount of data points associated with any given license plate detected and/or object of interest. While the cameras 100a-100n may be configured to provide the video files 500a-500n, the cameras 100a-100n may be configured to keep real-time data transmission bandwidth low by providing photos and/or video on request (with some latency). The cameras 100a-100n may prevent latency issues in transmitting photos and/or video for time-sensitive operations where still images are needed to confirm the accuracy of the object detection results by leveraging the distributed nature of the system 50 to deliver still image captures in real time cross referenced on the global alert list 552.

The cameras 100a-100n may upload the signal META to the metadata server 120 in real time (e.g., via the user devices 112a-112n and the network 60). The metadata server 120 may be a cloud-based system configured to cross reference the incoming metadata 158 with the global alert list 552 provided by the subscriber database 550 (or multiple subscribers). When the cross reference of the received metadata 158 with the global alert list 552 by the metadata server 120 returns a match, the metadata server 120 may prevent false positives by communicating with the cameras 100a-100n before sending a notification to the subscriber database 550.

When a match is detected, the metadata server 120 may transmit the alert list search criteria back to the camera(s) 100a-100n that just scanned the matching detected object. For example, the metadata server 120 may communicate the signal LIST to the camera 100a via the network 60 and/or the user device 112a. The signal META provided by the camera 100a that detected the matching object on the global alert list 552 may further comprise GPS coordinates (e.g., generated by the location module 460 and/or the smartphone 112a). The GPS coordinates of the camera 100a that captured the object matching search criteria of the global alert list 552 may be used to cross reference locations of other cameras 100b-100n that may be in the general vicinity of the camera 100a. For example, the metadata server 120 may determine which of the cameras 100b-100n are near the camera 100a that provided the detection of the object matching the global alert list 552 based on GPS coordinates provided in metadata uploaded by the cameras 100b-100n. The metadata server 120 may communicate the signal LIST to the camera 100a that detected the match as well as the cameras 100b-100n that are near the location that the camera 100a provided for the detected object that matches the global alert list 552. The amount of distance from the camera 100a to the other cameras 100b-100n for providing the signal LIST may be varied according to the design criteria of a particular implementation.

One or more of the cameras 100a-100n may receive the signal LIST. The information in the signal LIST may be stored by the circuits 102a-102n as the alert lists 532a-532n (e.g., local alert lists). When the cameras 100a-100n receive the signal LIST, the cameras 100a-100n may change to a different mode of operation. For example, the processor 452 may be configured to dynamically change the mode of operation in response to the signal LIST. Before receiving the signal LIST, the cameras 100a-100n may operate in a mode of operation that scans the captured video frames (e.g., using the video analytics module 490), generates metadata and uploads the metadata (or the video files 500a-500n upon request). After receiving the signal LIST, the cameras 100a-100n may operate in a mode of operation that additionally cross references each real time scan of objects by the video analytics module 490 with the entries in the local alert lists 532a-532n stored.

The cross-referencing performed by the processor 452 and/or the video analytics module 490 may be based on data extracted from the captured video frames. The cross-referencing may emulate human vision by detecting patterns, shapes and/or characteristics. By interpreting the data extracted from the captured video frames, the processor 452 may infer results, but may not actually see the video frame the way a human can see.

If the processor 452 determines that an object detected by the video analytics module 490 is a match to a search criteria entry from the local alert lists 532a-532n, the video frame from the input buffer 494 (e.g., a YUV buffer) that was used to detect the object may be sent to the image encoding module 496 (e.g., a JPEG encoding engine) to generate a still image. The communication module 450 may package the still image as the signal IMG and upload the signal IMG along with the metadata (e.g., the signal META) to the metadata server 120.

When the metadata server 120 and/or the database 130 detects the match with the global alert list 552 and after the associated still image IMG is received from the camera 100a, the metadata server may be configured to provide a notification to the subscriber database. The notification may comprise the signal META and/or the signal IMG. For example, the subscriber 550 may receive the GPS coordinates of the location of the camera 100a that detected the match and the associated still image capture. The subscriber 550 may manually analyze the still image to verify the match and/or respond accordingly.

In some embodiments, the subscriber database 550 may provide the signal LIST to the metadata server 120. The metadata server 120 may store the signal LIST as the global alert list 552. When new information is received for the global alert list 552, the metadata server 120 may be configured to analyze the database 130 for historical metadata scans that may match the information from the global alert list 552. The metadata server 120 and/or the database 130 may implement a module that may compute likely locations of the search criteria entries on the global alert list 552 based on historical information in the database 130. If there are historical metadata matches with the search criteria information in the global alert list 552, the metadata server 120 may determine likely locations of the entries on the global alert list 552.

The metadata server 120 may determine locations (e.g., based on GPS information provided by the signal META received from the cameras 100a-100n in real time) of the cameras 100a-100n. If there are any of the cameras 100a-100n in a vicinity near the locations calculated as having a high likelihood of detecting the entries from the global alert list 552, the metadata server 120 may communicate the signal LIST to each of the cameras 100a-100n that are in the vicinity of the location. The information from the signal LIST of the likely locations for the entries of the global alert list 552 may be added to the local alert lists 532a-532n for real-time cross referencing. The processor 452 may change the mode of operation to the cross-reference mode. For example, the cameras 100a-100n may be configured to change to the cross-referencing mode of operation before an initial match is detected by the cameras 100a-100n.

In some embodiments, the metadata server 120 may provide the signal LIST to the cameras 100a-100n based on geographical boundaries (e.g., nationwide, state and/or city boundaries). Generally, the more entries in the local alert lists 532a-532n, the more resources consumed by the camera systems 100a-100n both in terms of storage and computation (which may be limited in a real time embedded system).

In some embodiments, the processor 452 may be configured to select alternate modes of operation based on available resources of the circuits 102a-102n. In one example, if the camera 100a is only capable of efficiently performing LPR in real time (e.g., based on hardware limitations), and not additional analytics such as make, model, color detection, after a matching license plate is scanned from the local alert lists 532a-532n, the processor 452 may select a mode of operation where the video analytics module 490 suspends LPR scanning for incoming video frames and performs a less than real time operation of make, model, color detection on the current buffer and uploads the metadata. In an example, the information in the metadata uploaded to the database 130 may comprise information in a format such as plate: 5SAM321, make: Chevy, model: Volt, color: Light Blue, image: image.jpg. The format of the metadata and/or the image encoding format may be varied according to the design criteria of a particular implementation.

Figure 7:
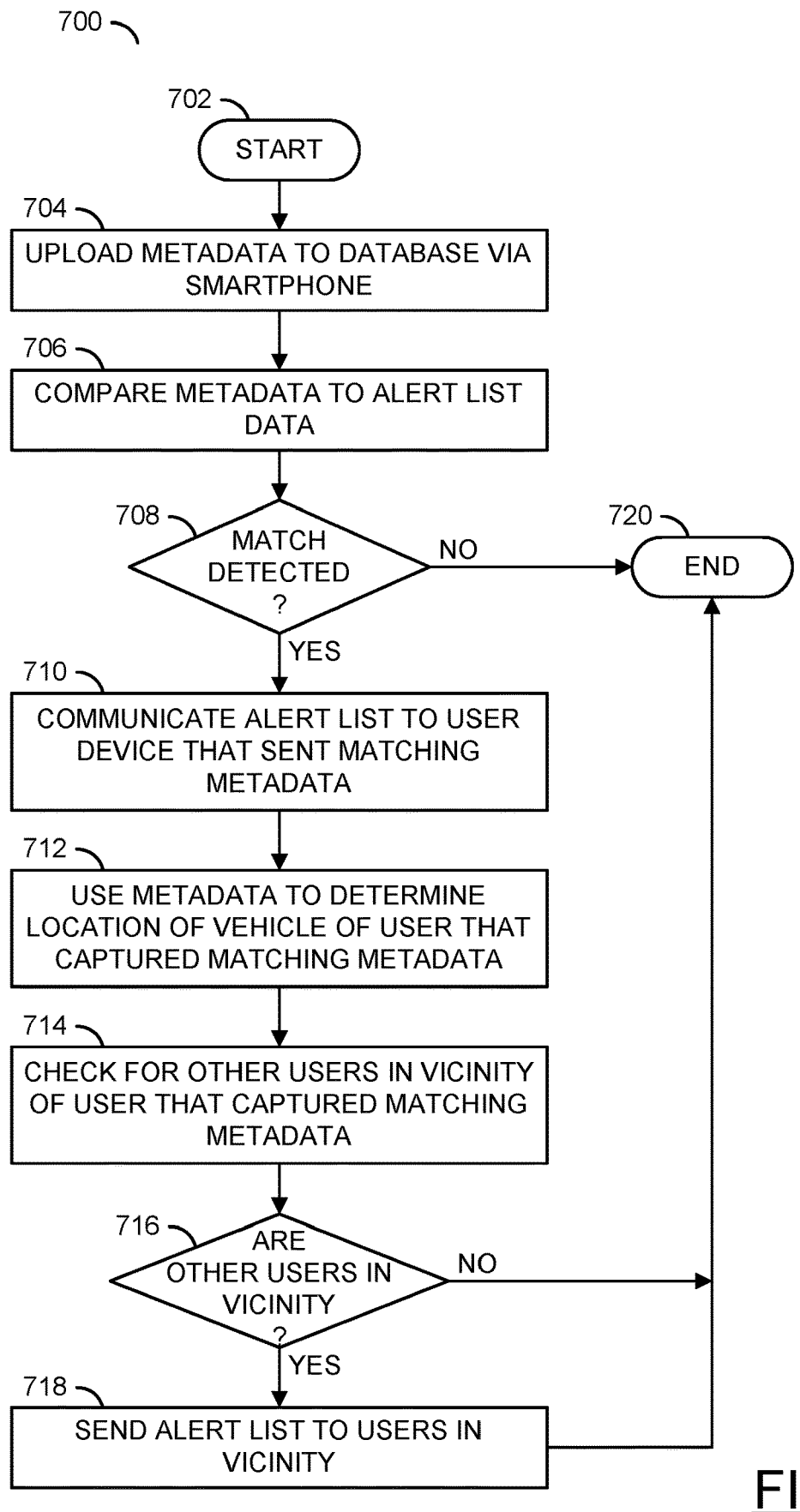
FIG. 7 is a flow diagram illustrating a method for matching an alert list and sending updates to users near the location of the match.

Referring to FIG. 7, a method (or process) 700 is shown. The method 700 may match an alert list and send updates to users near the location of the match. The method 700 generally comprises a step (or state) 702, a step (or state) 704, a step (or state) 706, a decision step (or state) 708, a step (or state) 710, a step (or state) 712, a step (or state) 714, a decision step (or state) 716, a step (or state) 718, and a step (or state) 720.

The state 702 may start the method 700. In the step 704, the communication module 450 may upload the metadata (e.g., the signal META) to the database 130 via one of the smartphones 112a-112n. Next, in the step 706, the metadata server 120 and/or the database 130 may compare the metadata 158 with the data in the global alert list 552. Next, the method 700 may move to the decision step 708.

In the decision step 708, the metadata server 120 and/or the database 130 may determine whether a match has been detected between the metadata 158 and one or more search criteria entries on the global alert list 552. If a match has not been detected, the method 700 may move to the step 720. If a match has been detected, the method 700 may move to the step 710. In the step 710, the metadata server 120 and/or the database 130 may communicate the alert list search criteria (e.g., the signal LIST) to the user device (e.g., the smartphone 112a) that sent the matching metadata. Next, in the step 712, the metadata sever 120 and/or the database 130 may use the metadata 158 to determine the location of the vehicle of the user that captured the matching metadata. In the step 714, the metadata server 120 and/or the database 130 may check for other users (e.g., the cameras 100b-100n) in the vicinity of the user (e.g., the camera 100a) that captured the matching metadata. Next, the method 700 may move to the decision step 716.

In the decision step 716 the metadata server 120 and/or the database 130 may determine whether there are other users in the vicinity of the camera 100a. If there are not other users in the vicinity of the camera 100a, the method 700 may move to the step 720. If there are other users in the vicinity of the camera 100, the method 700 may move to the step 718. In the step 718, the metadata server 120 and/or the database 130 may send the signal LIST to the users (e.g., the cameras 100b-100n) in the vicinity of the camera 100a. Next, the method 700 may move to the step 720. The step 720 may end the method 700.

The cameras 100a-100n may upload the metadata to the database 130 via the respective smartphone 112a-112n as shown in association with FIG. 6. The database 130 may store the uploaded metadata (e.g., the signal META) as the metadata 158. The subscriber database 550 may provide the signal LIST to provide the search criteria to be stored as the global alert lists 552 by the database 130. The database 130 (or the metadata server 120) may perform a comparison of the metadata 158 to the global alert lists 552. The metadata 158 may also comprise the current location (e.g., the clip metadata 182a-182n) of the camera (e.g., the camera 100a) at the time the video was captured along with the object information 186a-186n. If there is a match, then the database 130 may send the alert lists (e.g., the signal LIST) to the camera that detected the object on the global alert list 552. The metadata server 120 may also send the signal LIST to other of the cameras (e.g., 100b-100n) nearby the camera 100a that detected the object on the global alert list 552.

In some embodiments, the metadata 158 may be uploaded using the respective smartphone 112a-112n. In some embodiments, the cameras 100a-100n may comprise a Wi-Fi and/or cellular communication modules. For example, LTE may be built into the cameras 100a-100n (e.g., part of the wireless communication module 450). In another example, the cameras 100a-100n may archive the metadata internally (e.g., using the memory 454) until the user drives into a Wi-Fi enabled zone. The data may be uploaded when within the Wi-Fi enabled zone and/or using 3G/4G/5G connectivity.

The metadata 158 sent to the database 130 may include the GPS co-ordinates. In one example, the database 130 may receive the location of the vehicle of user that captured the matching metadata. In another example, the database 130 may use the metadata 158 to determine the location of the user that captured the matching metadata. In some embodiments, steps to check for other users in the vicinity of the user that captured the matching metadata may be combined with steps to communicate the alert list signal LIST to the user device that sent matching metadata (e.g., based on the camera ID 182n). A step for checking if other vehicles are nearby may be a check by the server 120 to determine the other users that are near the vehicle that found the match to the alert list. In some embodiments, only the vehicles that are in the vicinity of the match may receive the alert list (and change to the scan and cross-reference mode of operation).

The system 50 may utilize existing infrastructure to upload data points inexpensively. Generally, the video metadata 158 (e.g., not the actual video or still pictures) may be sent to the cloud/database 130. The system 50 may utilize the smartphones 112a-112n of the driver and may be configured to be respectful of the data usage that might go over the carrier (e.g., internet service provider) data plan, which could result in expensive overage charges. The system 50 may be configured to send video and/or still images to the cloud/database on demand (e.g., in response to a match with the global hit list 552 and/or a user request). The video and/or still images may be made available when desired, but transferring of video and/or still images may not be the default configuration.

In one example, a vehicle of interest (e.g., from the global alert list 552) may be spotted and the subscriber (e.g., government agencies, local police, a towing company, an insurance company, etc.) may need visual confirmation that the LPR (or detected object) is accurate. A notification may be sent to the camera 100a that spotted the vehicle of interest as well as other drivers in the vicinity. The cameras 100a-100n that receive the signal LIST may enter the cross-reference mode of operation and start cross-referencing the scanned plates (or objects) with the local alert lists 532a-532n (or at least the plate that was scanned as an object of interest). Still images of the target plate and/or target object (even if there is a low confidence detection) may be captured and uploaded (e.g., the signal IMG) along with the general metadata (e.g., the signal META) in the cross-referencing mode of operation.

Figure 8:
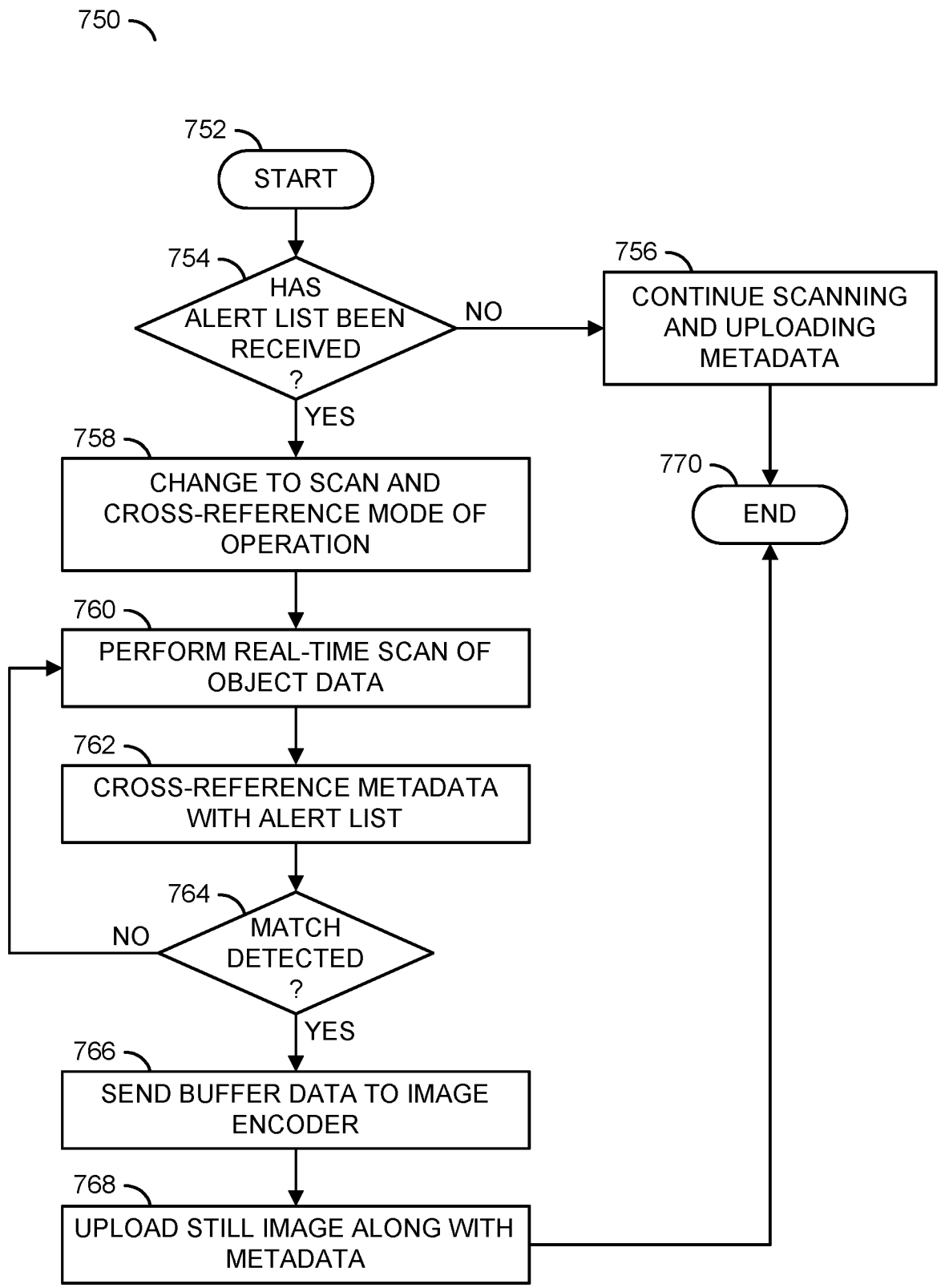
FIG. 8 is a flow diagram illustrating a method for enabling a cross-reference mode of operation in response to receiving a local alert list.

Referring to FIG. 8, a method (or process) 750 is shown. The method 750 may enable a cross-reference mode of operation in response to receiving a local alert list. The method 750 generally comprises a step (or state) 752, a decision step (or state) 754, a step (or state) 756, a step (or state) 758, a step (or state) 760, a step (or state) 762, a decision step (or state) 764, a step (or state) 766, a step (or state) 768, and a step (or state) 770.

The step 752 may start the method 750. Next, in the decision step 754, the processor 452 may determine whether the alert list has been received. For example, the metadata server 120 may communicate the signal LIST to one or more of the cameras 100a-100n and the search criteria data from the signal LIST may be stored as the local alert lists 532a-532n. If the alert list has not been received, the method 750 may move to the step 756. In the step 756, the cameras 100a-100n may continue operating in the default scan mode of operation (e.g., continue scanning and uploading metadata). Next, the method 750 may move to the step 770.

In the decision step 754, if the alert list has been received, the method 750 may move to the step 758. In the step 758, the processor 452 may change the mode of operation of the camera to the scan and cross-reference mode of operation. Next, in the step 760, the video analytics module 490 may perform real-time scans of object data (e.g., generate metadata based on the objects detected). In the step 762, the processor 452 may cross-reference the metadata (e.g., stored in the metadata cache 520) with the local alert lists 532a-532n. Next, the method 750 may move to the decision step 764.

In the decision step 764, the processor 452 may determine whether a match is detected (e.g., based on the cross-reference between the metadata and the local alert lists 532a-532n). If no match is detected, the method 750 may return to the step 760. If a match is detected, the method 750 may move to the step 766. In the step 766, the processor 452 may send the data in the input buffer 494 to the image encoding module 496. Next, in the step 768, the image encoding module may generate the still image from the video frame and the wireless communication module 450 may upload the still image (e.g., the signal IMG) along with the metadata (e.g., the signal META). Next, the method 750 may move to the step 770. The step 770 may end the method 750.

Generally, the cameras 100a-100n operate in the default capture mode of operation (e.g., capturing video, scanning/analyzing objects and uploading metadata) until the server sends the alert list(s). When the local alert lists 532a-532n are received, the cameras 100a-100n may change the mode of operation to the cross-reference mode of operation (e.g., cross-reference detected objects with the local alert lists 532a-532n in real-time). If the cross-reference to the local alert lists 532a-532n finds a match, then the processor 452 may encode a still image from the data in the input buffer 494 using the image encoding module 496. The cameras 100a-100n may use the respective smartphones 112a-112n to upload the still image and the metadata to the database 130 to enable manual/visual inspection by a person.

A timeout parameter may be implemented for the local alert lists 532a-532n stored on the cameras 100a-100n. For example, after a certain amount of time has passed one or more of the local alert lists 532a-532n may be dropped. In another example, after the vehicle moves outside of a location (e.g., a pre-determined range around the likely location of the object on the local alert lists 532a-532n) then the local alert lists 532a-532n may expire. The timeout parameter may expire/drop the local alert lists 532a-532n to prevent wasting resources when the object(s) on the local alert lists 532a-532n may be unlikely to be detected. In some embodiments, the metadata server 120 may present the signal INTR to instruct the processor 452 to drop/expire one or more of the local alert lists 532a-532n.

The central server 120 may be configured to look at both historical data points and/or real time data to calculate the probability of the vehicle(s) and/or object(s) in the local alert lists 532a-532n becoming inactive. The historical data points may be scanned and analyzed to understand the probability that the object of interest is still on the roadway. In one example, the vehicle (or object) may have only historically been seen before 10:00 PM on weekdays and 11:00 PM on weekends. In another example, the object may have never be seen between 10:00 AM and 4:00 PM. In yet another example, the vehicle (or object) may be spotted at 2:00 PM (e.g., outside the historical data points for the object), which may mean that the historical results should not be considered or at least be considered less.

Figure 9:
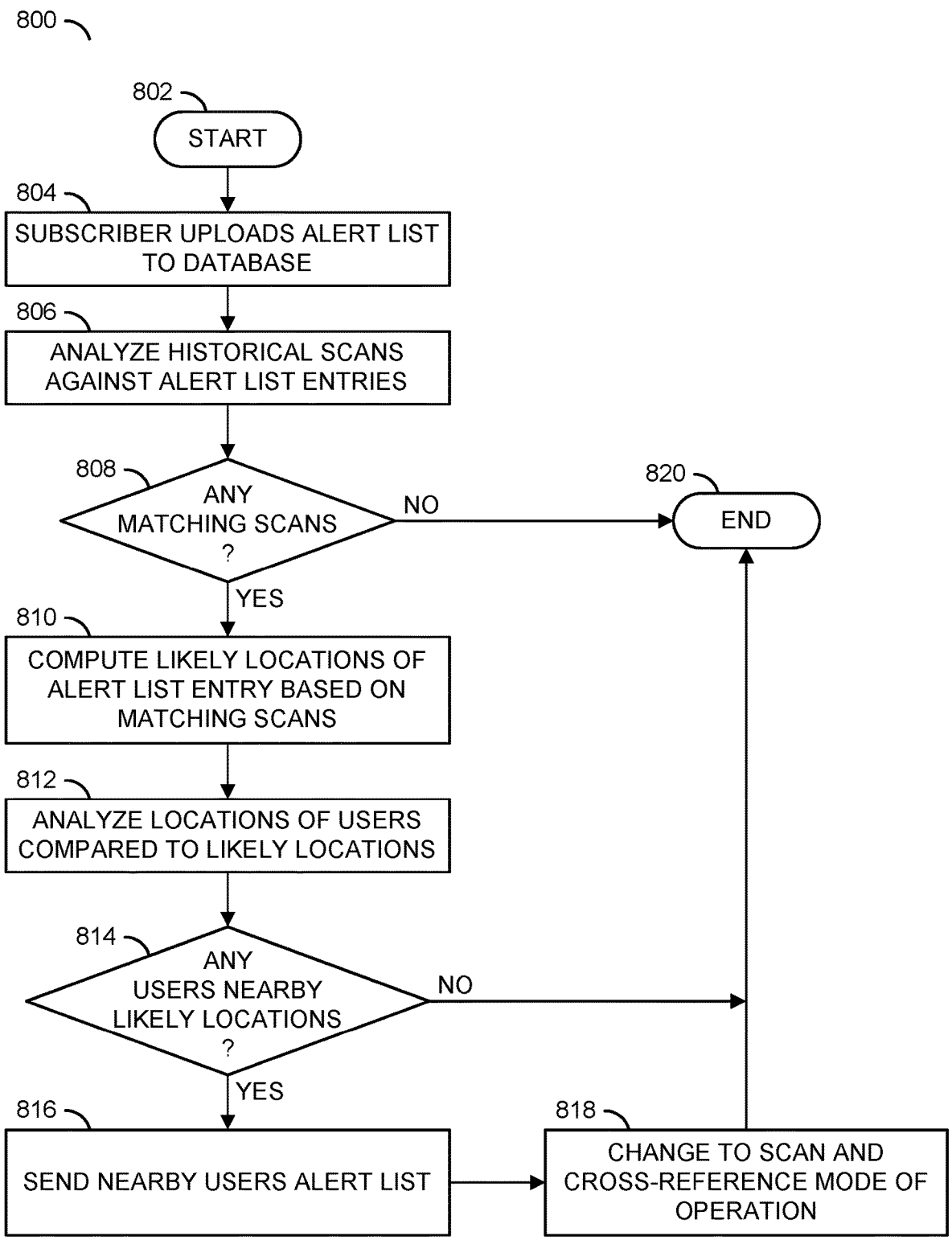
FIG. 9 is a flow diagram illustrating a method for searching historical data to find matches.

Referring to FIG. 9, a method (or process) 800 is shown. The method 800 may search historical data to find matches. The method 800 generally comprises a step (or state) 802, a step (or state) 804, a step (or state) 806, a decision step (or state) 808, a step (or state) 810, a step (or state) 812, a decision step (or state) 814, a step (or state) 816, a step (or state) 818, and a step (or state) 820.

The step 802 may start the method 800. Next, in the step 804, the subscriber (e.g., the subscriber database 550) may upload the alert list (e.g., the signal LIST) to the database 130. For example, the database 130 may store the signal LIST as part of the global alert list 552. In the step 806, the metadata server 120 may analyze historical scans (e.g., information previously stored in the metadata 158) against the entries of the global alert list 552. Next, the method 800 may move to the decision step 808.

In the decision step 808, the metadata server 120 may determine whether the search criteria in the global alert list 552 matches any historical scans in the metadata 158. If there are no matching scans, the method 800 may move to the step 820. If there are matching scans, the method 800 may move to the step 810. In the step 810, the metadata server 120 may compute likely locations of the entries of the global alert list 552 based on the matching scans in the metadata 158. Next, in the step 812, the metadata server 120 may analyze locations of the users (e.g., the current position of the cameras 100a-100n) and compare the current location of the users with the likely locations of the entries of the global alert list 552. Next, the method 800 may move to the decision step 814.

In the decision step 814, the metadata server 120 may determine whether there are any users (e.g., the cameras 100a-100n) nearby the likely locations of the entries of the global alert list 552. If there are no users nearby, the method 800 may move to the step 820. If there are users nearby, the method 800 may move to the step 816. In the step 816, the metadata server 120 may send the nearby users the alert list (e.g., the signal LIST). Next, in the step 818, the cameras 100a-100n may change to the scan and cross-reference mode of operation. Next, the method 800 may move to the step 820. The step 820 may end the method 800.

In some embodiments, the system 50 may accept new entries for the alert list from the subscriber database 550. The database 130 may add the entries to the global alert list 552 and perform a search of the historical data (e.g., the metadata 158) already stored to find any matches. If there are matches, then the metadata server 120 may determine likely locations of the subject from the global alert list 552 based on where and when the previous (e.g., historical) matches were found. The metadata server 120 may find any users that are in the location that the subject from the global alert list 552 might be. The signal LIST may be sent to the cameras 100a-100n near the likely locations to be stored as the local alert lists 532a-532n to enable the cross-referencing mode of operation.

Figure 10:
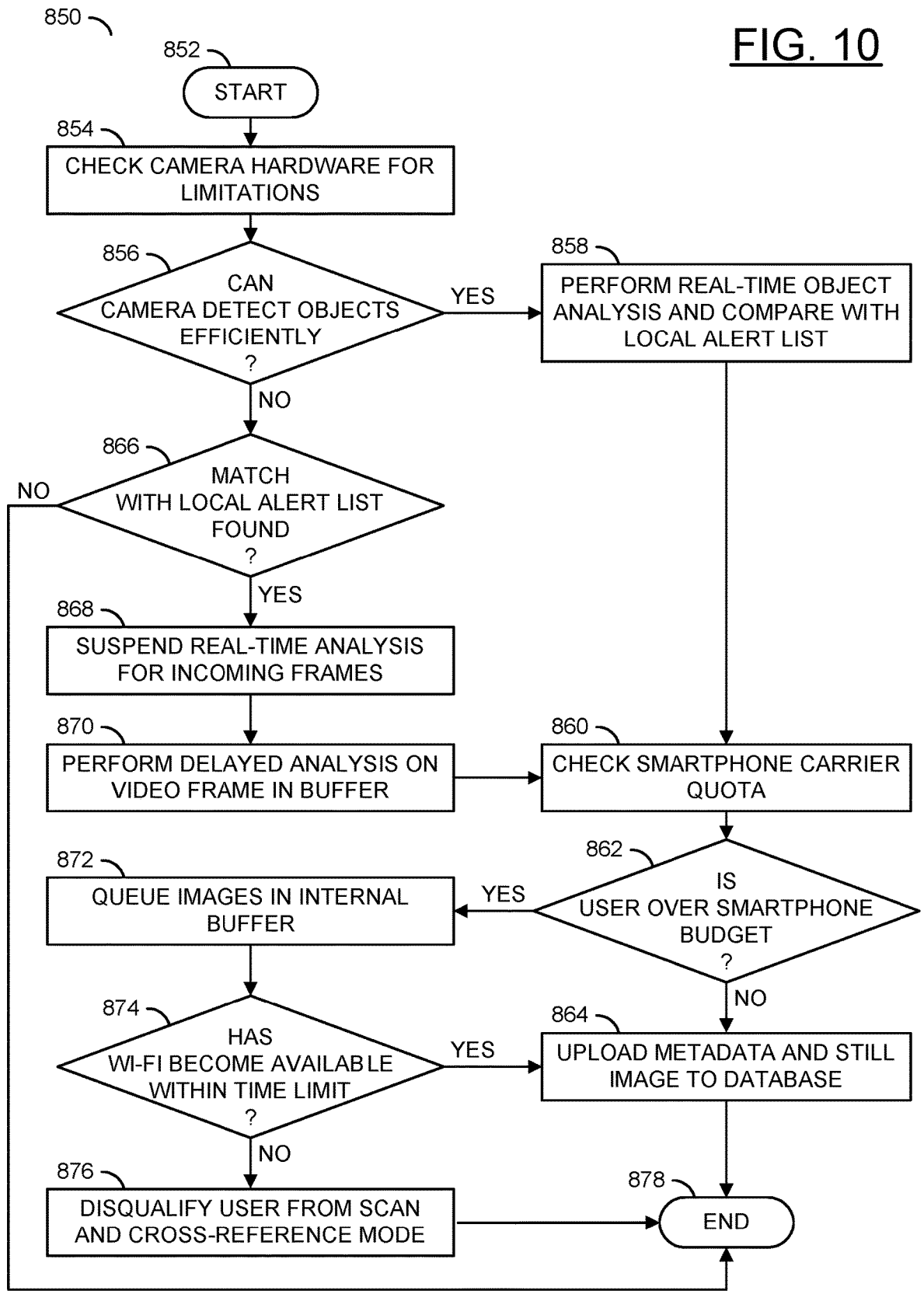
FIG. 10 is a flow diagram illustrating a method for managing resources on the camera.

Referring to FIG. 10, a method (or process) 850 is shown. The method 850 may manage resources on the camera. The method 850 generally comprises a step (or state) 852, a step (or state) 854, a decision step (or state) 856, a step (or state) 858, a step (or state) 860, a decision step (or state) 862, a step (or state) 864, a decision step (or state) 866, a step (or state) 868, a step (or state) 870, a step (or state) 872, a decision step (or state) 874, a step (or state) 876, and a step (or state) 878.

The step 852 may start the method 800. In the step 854, the processor 452 may check and/or determine the hardware limitations of the associated one of the cameras 100a-100n (e.g., perform a benchmark, read hardware information, etc.). Next, the method 850 may move to the decision step 856.

In the decision step 856, the processor 452 may determine whether the associated one of the cameras 100a-100n may detect objects efficiently. For example, whether the cameras 100a-100n are capable of detecting objects efficiently may be determined based on the hardware. If the cameras 100a-100n can detect objects efficiently, the method 850 may move to the step 858. In the step 858, the processor 452 may perform real-time object analysis and compare the detected objects with the search criteria entries from the local alert lists 532a-532n (e.g., while in the cross-reference mode of operation). Next, in the step 860, the processor 452 may check the smartphone carrier quota. For example, the processor 452 may query the respective one of the smartphone 112a-112n to receive information about data plan usage. Next, the method 850 may move to the decision step 862.

In the decision step 862, the processor 452 may determine whether the user is over the smartphone data budget (e.g., whether additional data usage will incur fees for going over a data cap). If not, the method 850 may move to the step 864. In the step 864, the wireless communication module 450 may upload the metadata and the still image to the database 130. Next, the method 850 may move to the step 878.

In the decision step 856, if the cameras 100a-100n cannot detect objects efficiently, the method 850 may move to the decision step 866. In the decision step 866, the processor 452 may determine whether there is a match of the detected objects and the objects from the local alert lists 532a-532n. If there is not a match, the method 850 may move to the step 878. If there is a match, the method 850 may move to the step 868. In the step 868, the processor 452 may suspend real-time analysis of incoming video frames. Next, in the step 870, the processor 452 may perform delayed analysis on the video frames stored in the input buffer 494. Next, the method 850 may move to the step 860.

In the decision step 862, if the user is over the smartphone data budget, the method 850 may move to the step 872. In the step 872, the processor 452 may queue images in the internal buffer 494. Next, the method 850 may move to the decision step 874.

In the decision step 874, the processor 452 may determine whether Wi-Fi has become available within a pre-determined time limit (e.g., if data may be transmitted without affecting the data plan of the user). For example, the length of the time limit may be based on the size of the input buffer 494 and/or other memory available to the circuits 102a-102n. If Wi-Fi has become available, the method 850 may move to the step 864. If Wi-Fi is not available, the method 850 may move to the step 876. In the step 876, the cameras 100a-100n that do not have access to free data transmission may be disqualified from the scan and cross-reference mode of operation and the processor 452 may change to the default scanning mode of operation. Next, the method 850 may move to the step 878. The step 878 may end the method 850.

The processor 452 and/or the metadata server 120 may be configured to manage resources for one or more of the cameras 100a-100n. In some embodiments, the server may receive a report of the hardware of the cameras 100a-100n used by a user. In some embodiments, the processors 452 on-board the cameras 100a-100n may determine (or know) the hardware capabilities of the cameras 100a-100n (e.g., perform self-diagnostics to determine whether performance may be affected based on available battery power, based on heat conditions, etc.). If the hardware is capable of performing each task in real-time and/or without risking the integrity of the results, then the cameras 100a-100n may perform real-time scans and do cross-referencing if there are any local alert lists 532a-532n to search against. If the hardware is not capable of doing real-time video analysis/object detection and cross-reference with the local alert lists 532a-532n, then real-time analysis may be temporarily suspended. Analysis may be performed later (e.g., non-real time) as resources become available.

In some embodiments, the system 50 may be configured to check the data budget for the smartphones 112a-112n of the user (e.g., how much of the ISP/carrier data plan has been used). For example, the driver may have a limited carrier data quota and cannot upload photos in real time without incurring overage fees. When the driver/user has limited data usage available, the system 50 may disqualify the driver from changing modes of operation (e.g., prevent the user from entering the cross-referencing and uploading mode and/or prevent uploading of video and/or still images temporarily). In one example, the smartphones 112a-112n may be configured to queue the photos in an internal buffer until the smartphones 112a-112n move into a Wi-Fi zone (e.g., when there are no data restrictions). In some embodiments, the smartphones 112a-112n may be configured to form a local network (e.g., short-range network) and a user that does not have data plan availability may forward the images/videos to another user that does have data plan availability.

Figure 11:
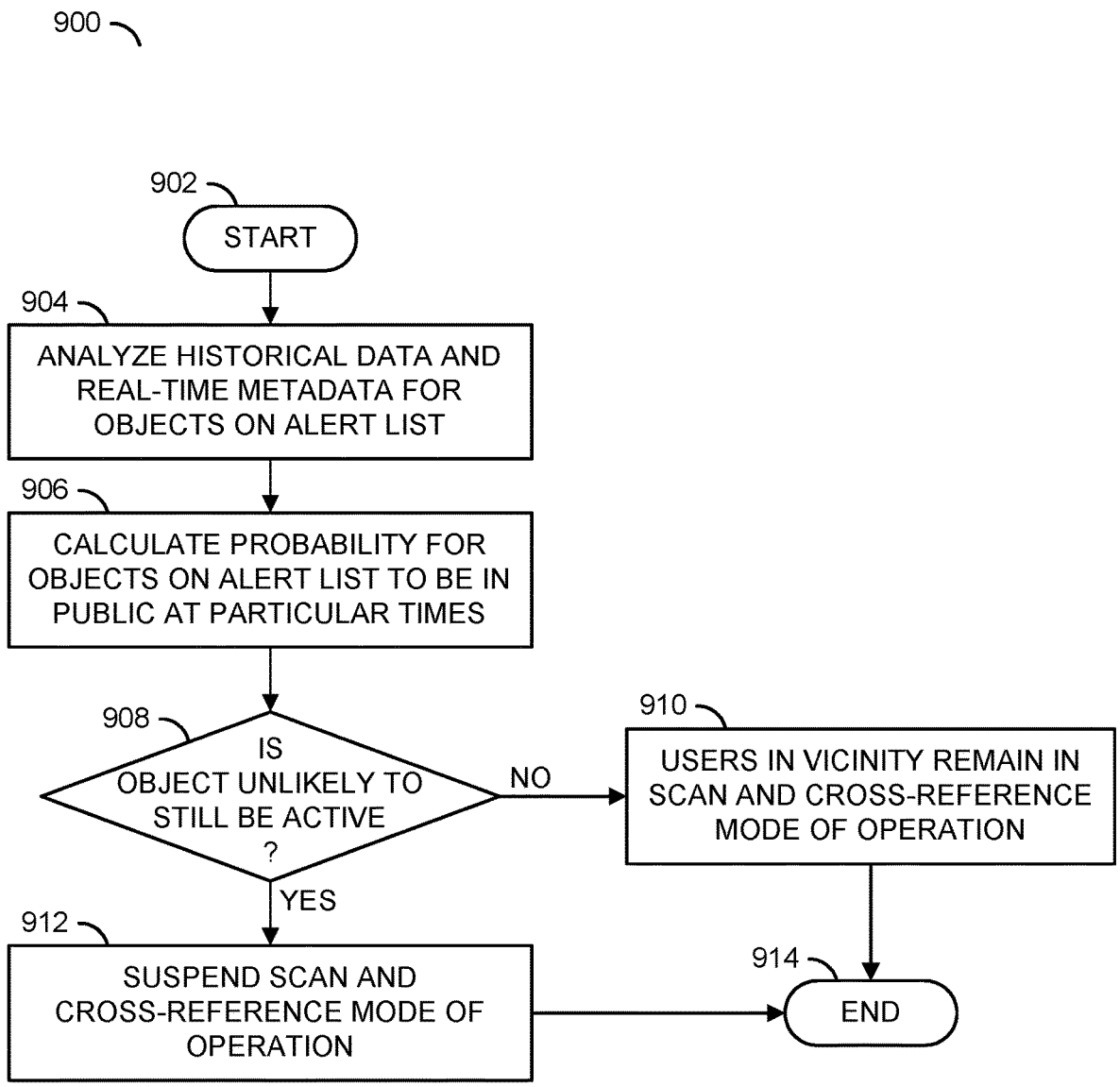
FIG. 11 is a flow diagram illustrating using historical data to calculate the probability of the target vehicle being on the roadway and/or in public.

Referring to FIG. 11, a method (or process) 900 is shown. The method 900 may use historical data to calculate the probability of the target vehicle being on the roadway and/or in public. The method 900 generally comprises a step (or state) 902, a step (or state) 904, a step (or state) 906, a decision step (or state) 908, a step (or state) 910, a step (or state) 912, and a step (or state) 914.

The step 902 may start the method 900. In the step 904, one or more processors (e.g., cloud processing) implemented by the metadata server 120 and/or the database 130 may analyze the historical metadata 158 and/or the real-time metadata for object stored on the global alert list 552. Next, in the step 906, the processors of the metadata server 120 may calculate probabilities for one or more objects from the global alert list 552 to be in public (or in particular locations) at particular times. Next, the method 900 may move to the decision step 908.

In the decision step 908, the metadata server 120 may determine whether one or more objects from the global alert list 552 may be unlikely to still be active based on the probabilities determined in the step 906. If the object is likely to be active, the method 900 may move to the step 910. In the step 910, the cameras 100a-100n that are in the vicinity where the statistical information indicates the target object may be, may operate in the scan and cross-reference mode of operation. Next, the method 900 may move to the step 914. In the decision step 908, if the object is not likely to be active, the method 900 may move to the step 912. In the step 912, the cameras 100a-100n may suspend the scan and cross-reference mode of operation and revert to the default scanning mode of operation. Next, the method 900 may move to the step 914. The step 914 may end the method 900. The system 50 may use historical data (e.g., previously stored metadata 158 along with newly incoming metadata form the cameras 100a-100n) to calculate the probability of the target vehicle being on the roadway and/or in public. For example, the target vehicle from the global alert list 552 may be parked in front of a store and/or in a parking lot instead of a roadway but still in public and in an area that may be scannable by the cameras 100a-100n. For example, debtors often hide vehicles at a house of a friend or in a parking garage so that the vehicle may not be in an expected location. Calculating the probability for objects on the global alert list 552 to be in particular places in public and at particular times from the historical data may enable an efficient use of resources. For example, if the object is unlikely to be in public at a particular time and/or location then the scan and cross-reference mode may be suspended. Suspending the scan and cross-reference mode of operations may free camera resources to perform video analysis and/or extract metadata in real-time.

The functions performed by the diagrams of FIGS. 1-11 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. A system comprising:
  a capture device configured to (i) capture video, (ii) perform video analysis to extract metadata corresponding to said captured video in a first mode, (iii) communicate with a wireless communication device, (iv) store a local alert list, (v) cross-reference said metadata with local search criteria from said local alert list in a second mode and (vi) generate an image in response to detecting said local search criteria in said second mode; and
  a database configured to (i) communicate with said wireless communication device, (ii) store said metadata received from said wireless communication device, (iii) store a global alert list comprising a global search criteria, (iv) compare only said metadata with said global search criteria, (v) generate said local alert list from said global search criteria of said global alert list that corresponds to a match and communicate said local alert list to said capture device if said match is detected between said metadata and said global search criteria and (vi) communicate said image to a subscriber associated with said global alert list, wherein
  (i) said metadata is used by said database to determine objects detected in said captured video without receiving said captured video,
  (ii) said subscriber provides said global alert list to said database,
  (iii) said capture device is configured to initiate a said second mode to perform said cross-reference of said metadata with said local search criteria after said local alert list is received,
  (iv) said local alert list comprises a portion of data from said global alert list,
  (v) said local search criteria comprises said portion of said data from said global alert list that corresponds to said match of said metadata to said global search criteria,
  (vi) said image is encoded from an input buffer of said capture device for capturing said video and communicated to said database without communicating said video in said second mode, and
  (vii) said capture device encodes said video in said first mode and encoding said video is delayed in said second mode.

2. The system according to claim 1, wherein (i) said global alert list is used by said database to locate a person of interest without access to said video and (ii) said global search criteria comprises information associated with said person of interest in a format configured to enable a comparison with said metadata.

3. The system according to claim 2, wherein said global search criteria comprises a description of a vehicle used by said person of interest, a license plate of a vehicle used by said person of interest and physical characteristics of said person of interest.

4. The system according to claim 1, wherein said subscriber is at least one of a law enforcement agency, a private investigator, a bail bondsman and creditor.

5. The system according to claim 1, wherein said database is configured to (i) generate statistical information about said global search criteria to present to said capture device as said local search criteria based on said metadata and historical metadata, (ii) determine a probable time and location for using said capture device to find said local search criteria and (iii) instruct said capture device to suspend said second mode to perform said cross-reference when said local search criteria is unlikely to be detected.

6. The system according to claim 1, wherein said image enables said subscriber to manually verify a detection of said global search criteria by said capture device.

7. The system according to claim 1, wherein (i) said capture device and a plurality of other capture devices are configured to provide said metadata to said database, (ii) said database is configured to use said metadata to determine a location of said capture device in response to said match, (iii) determine a subset of said other capture devices that are in a vicinity of said capture device that captured said metadata that corresponds to said match based on said location, (iv) communicate said local alert list to said subset of said other capture devices, (v) said subset of said other capture devices enter said second mode in response to receiving said local alert list, and (vi) at least one additional image comprising said local search criteria is received by said database from at least one of said subset of said other capture devices.

8. The system according to claim 1, wherein (i) said database is configured to match said metadata to only said global search criteria of said global alert list, (ii) a processor of said capture device is configured to perform said cross-reference of said metadata to only said local search criteria of said local alert list and (iii) said local alert list enables said cross-reference to be performed by said processor in real-time.

9. The system according to claim 1, wherein said capture device is implemented in a vehicle and said database is implemented in a server computer remotely located from said vehicle.

10. An apparatus comprising:
  a processor configured to (i) receive video frames captured by a capture device, (ii) perform video analysis on said video frames to extract metadata corresponding to objects detected in said video frames and (iii) generate a still image from said video frames;
  a memory configured to store one or more local alert lists; and a communication device configured to (i) present (a) said metadata and (b) said still image and (ii) receive said local alert lists, wherein
- (a) said processor operates in a default mode of operation and a cross-reference mode of operation,
- (b) said processor selects said cross-reference mode of operation in response to receiving one of said local alert lists,
- (c) in said default mode of operation (i) said processor is further configured to extract said metadata in real-time, (ii) said memory stores said video frames and (iii) said communication device communicates said metadata to an external database without communicating said video frames,
- (d) said cross-reference mode of operation consumes more power, uses more resources of said processor, and is only used in response to receiving at least one of said local alert lists,
- (e) in said cross-reference mode of operation said processor is further configured to (i) compare said metadata to local search criteria in said local alert lists and (ii) generate said still image when said metadata matches said local search criteria,
- (f) said metadata alone is uploaded to said external database to enable said external database to enable an external comparison of only said metadata with global search criteria of a global alert list without receiving said video frames,
- (g) said communication device receives at least one of said local alert lists in response to said external database detecting a match between said metadata and said global search criteria,
- (h) said external database is configured to generate said local alert lists from said global search criteria of said global alert list that corresponds to said match, and
- (i) said local alert lists each comprise a portion of data of said global alert list,
- (j) said local search criteria comprises said portion of said data from said global alert list that corresponds to said match of said metadata to said global search criteria,
- (k) said still image is encoded from an input buffer of said processor for capturing said video frames and communicated to said external database without communicating said video in said cross-reference mode, and
- (l) said processor encodes said video frames in said default mode and encoding said video frames is delayed in said cross-reference mode.

11. The apparatus according to claim 10, wherein said metadata comprises information about objects detected by said processor in said video frames and a location of said apparatus at a time of detecting said objects.

12. The apparatus according to claim 10, wherein (i) said local alert lists comprise said local search criteria for detecting said objects provided by a subscriber user and (ii) said still image is presented to said subscriber user to enable a manual verification of at least one object of said objects detected by said apparatus.

13. The apparatus according to claim 10, wherein said apparatus is implemented as a vehicle dashcam.

14. The apparatus according to claim 10, wherein (i) said metadata further comprises a confidence level and (ii) said confidence level indicates a likelihood that a detection of said objects is accurate.

15. The apparatus according to claim 10, wherein (i) said communication device is configured to connect to a smartphone to enable communication with said external database, (ii) said processor is configured to determine a data quota for said smartphone and (iii) said processor is configured to suspend uploading said metadata and uploading said still image if said data quota will be exceeded.

16. The apparatus according to claim 10, wherein said processor is configured to compare said metadata to said local search criteria in said local alert lists and generate said still image in said cross-reference mode of operation while performing said video analysis on said video frames to extract said metadata in real-time.

17. The apparatus according to claim 10, wherein said processor is configured to compare said metadata to said local search criteria in said local alert lists and generate said still image in said cross-reference mode of operation and delay performing said video analysis on said video frames to extract said metadata based on an amount of resources available to said processor.

18. The apparatus according to claim 10, wherein (i) the communication device is further configured to receive a signal to suspend the cross-reference mode of operation based on a probability for said local search criteria in said local alert lists to be in particular places in public at particular times and (ii) the processor is further configured to suspend the cross-reference mode of operation in response to receiving the signal to suspend.

19. The apparatus according to claim 18, wherein said external database is configured to calculate the probability for said local search criteria in said local alert lists to be in particular places in public at particular times based on historical metadata determined from said metadata over time.

20. The apparatus according to claim 10, wherein (i) said external database is configured to match said metadata to only said global search criteria of said global alert list, (ii) said processor is configured to perform a cross-reference of said metadata to only said local search criteria of said local alert lists and (iii) uploading said metadata without said video frames (a) reduces an amount of bandwidth used when uploading to said external database and (b) enables said external database to analyze information about said objects detected in said video frames instead of said processor.

* * * * *